Sept. 21, 1954 C. W. BRANDON 2,689,461
METHOD AND APPARATUS FOR THE STORAGE, REFRIGERATION, AND
TRANSPORTATION OF VOLATILE LIQUIDS AND OTHER FLUIDS
Filed July 16, 1948 10 Sheets-Sheet 1

Clarence W. Brandon
INVENTOR.

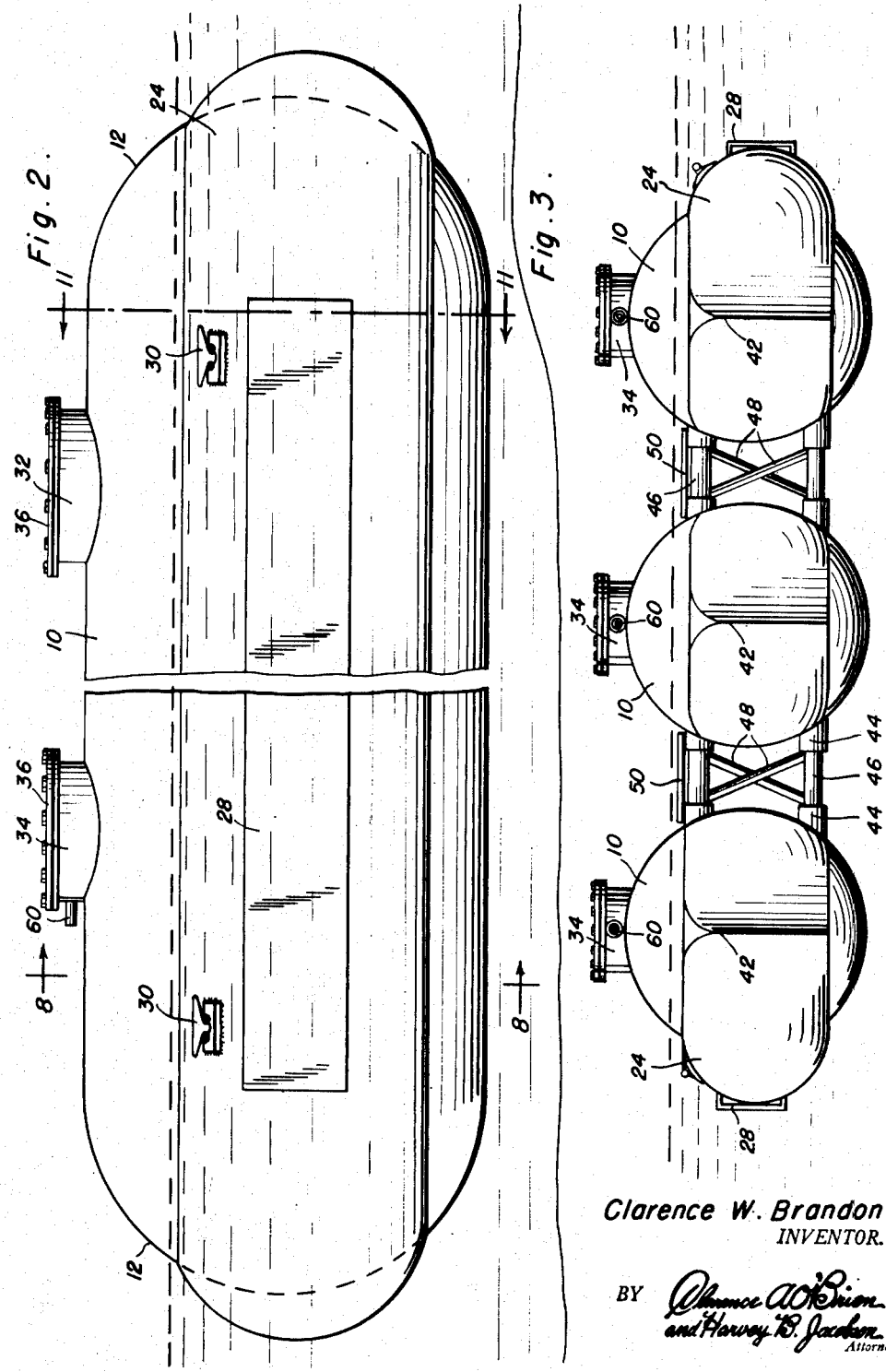

Clarence W. Brandon
INVENTOR.

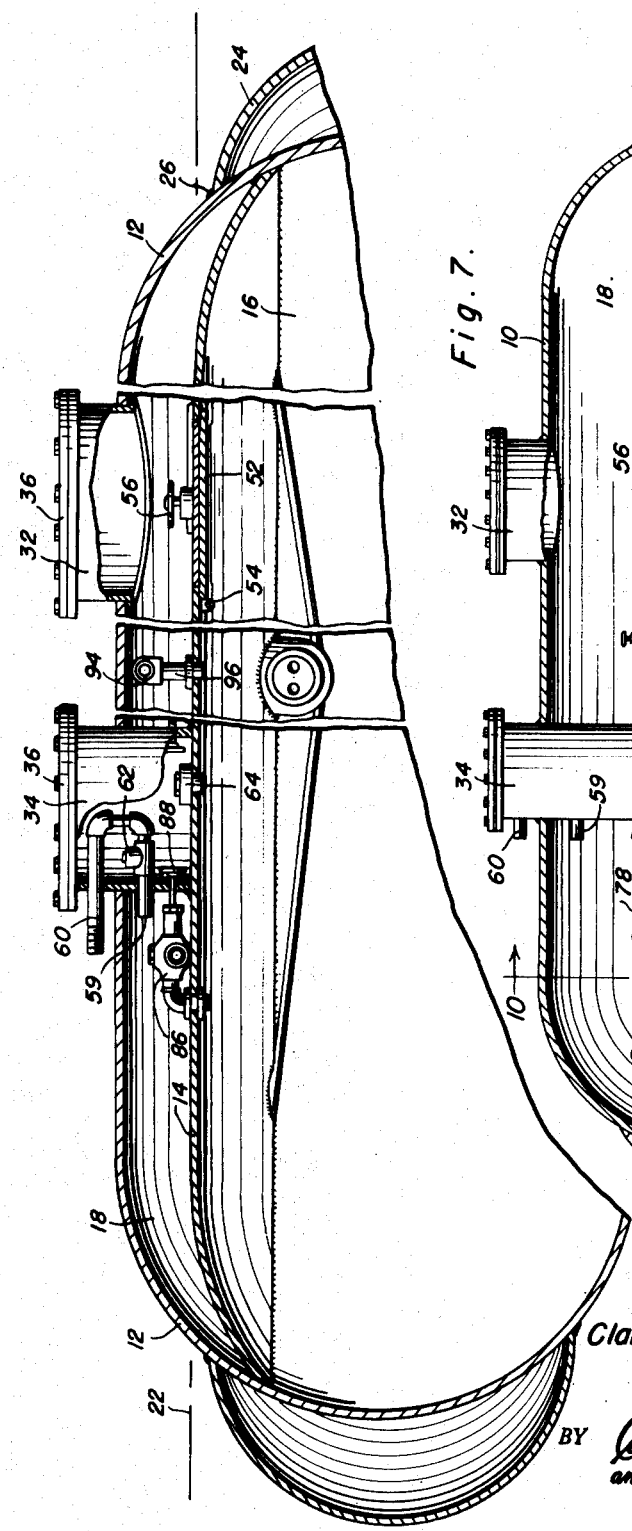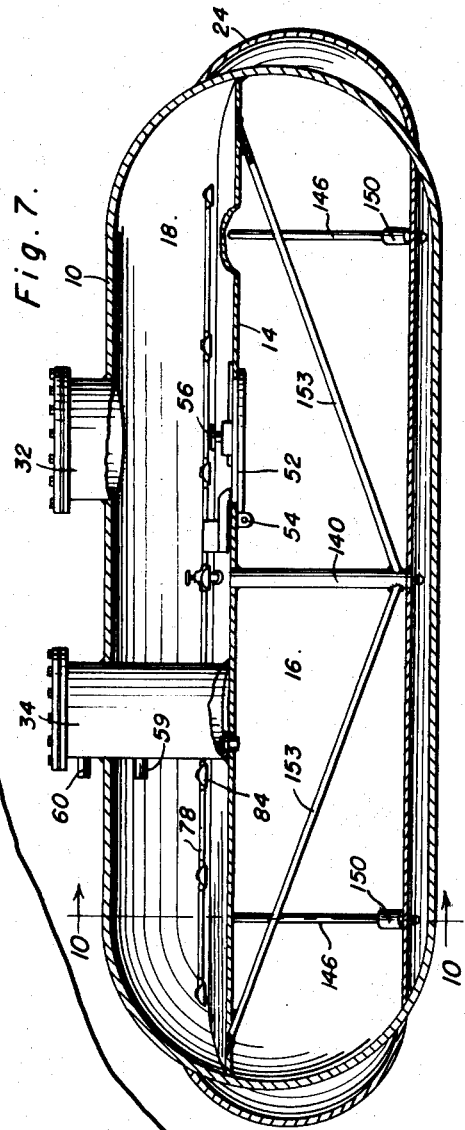

Sept. 21, 1954  C. W. BRANDON  2,689,461
METHOD AND APPARATUS FOR THE STORAGE, REFRIGERATION, AND
TRANSPORTATION OF VOLATILE LIQUIDS AND OTHER FLUIDS
Filed July 16, 1948  10 Sheets-Sheet 5

Clarence W. Brandon
INVENTOR.

Sept. 21, 1954 C. W. BRANDON 2,689,461
METHOD AND APPARATUS FOR THE STORAGE, REFRIGERATION, AND
TRANSPORTATION OF VOLATILE LIQUIDS AND OTHER FLUIDS
Filed July 16, 1948 10 Sheets-Sheet 6
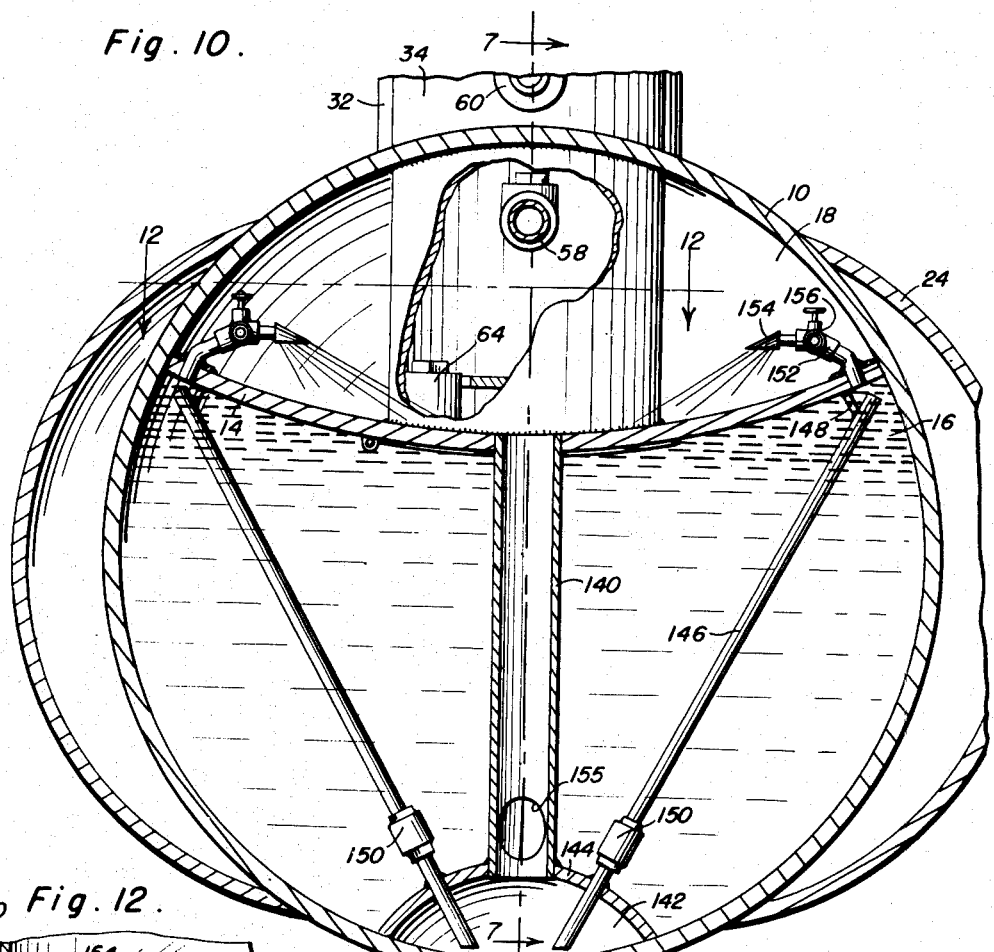
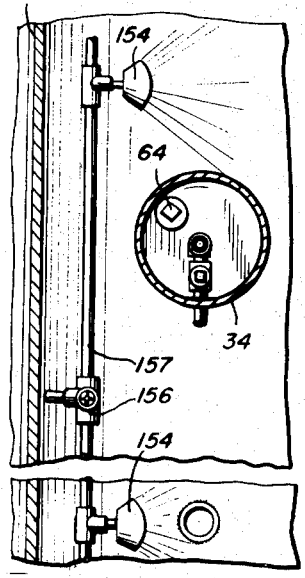
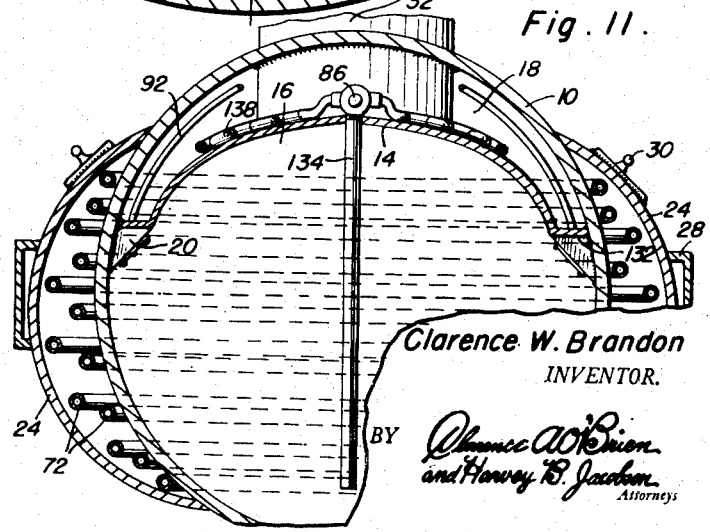
Clarence W. Brandon
INVENTOR.

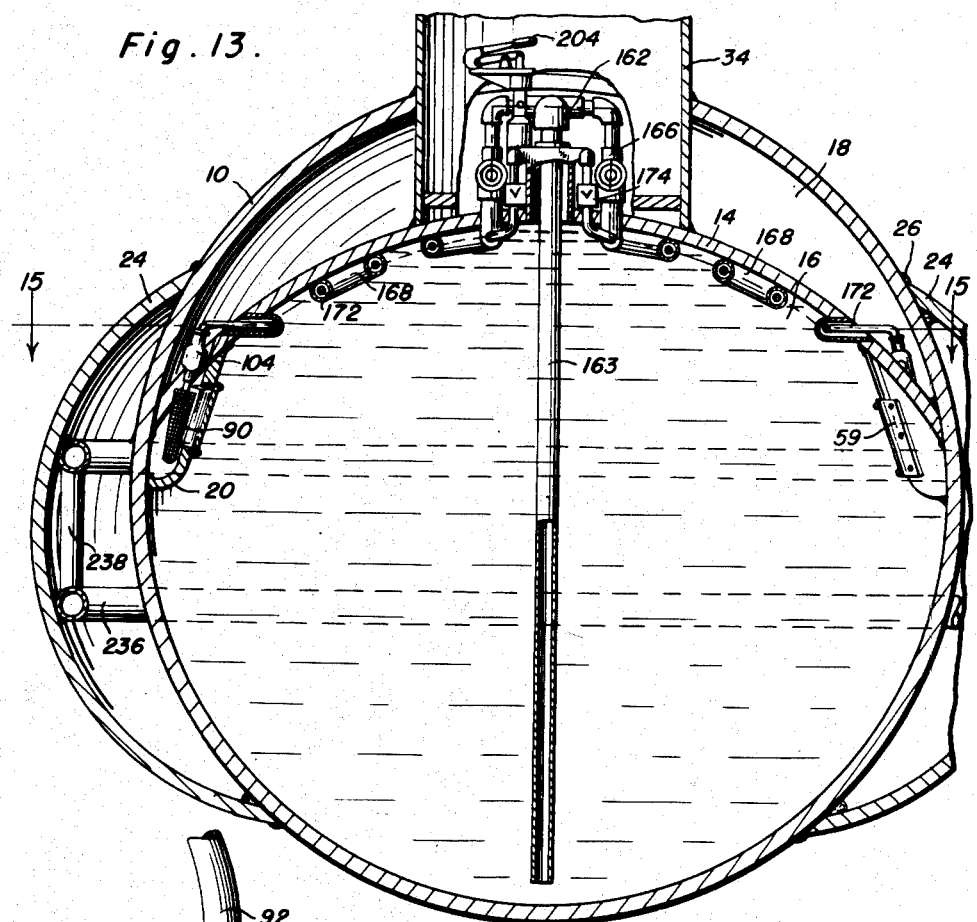
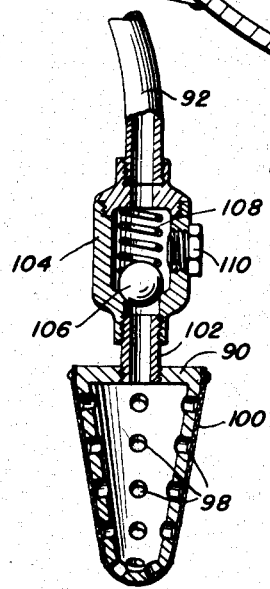
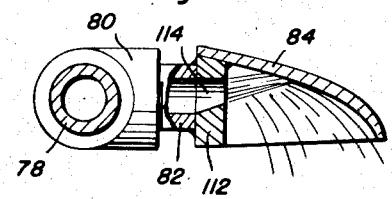
Clarence W. Brandon
INVENTOR.

Sept. 21, 1954 C. W. BRANDON 2,689,461
METHOD AND APPARATUS FOR THE STORAGE, REFRIGERATION, AND
TRANSPORTATION OF VOLATILE LIQUIDS AND OTHER FLUIDS
Filed July 16, 1948 10 Sheets-Sheet 8
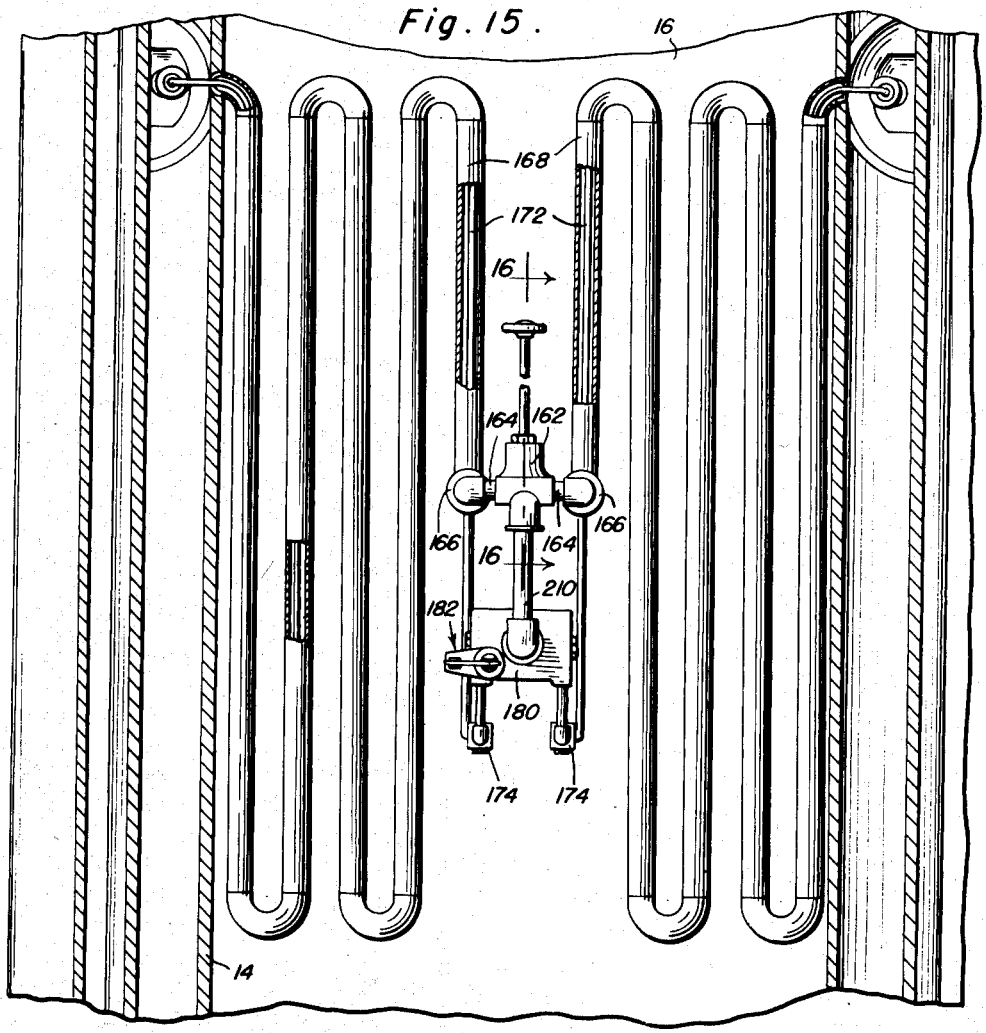
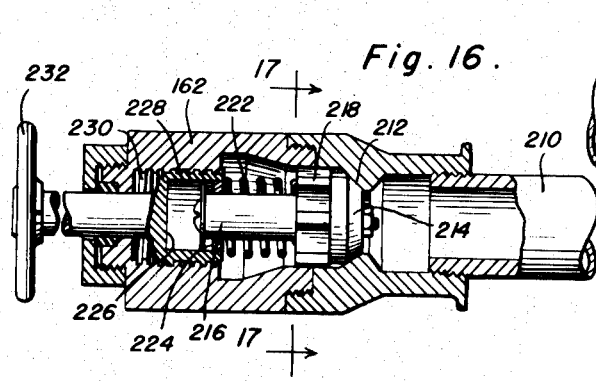
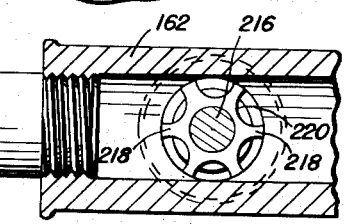
Clarence W. Brandon
INVENTOR.
BY *Clarence A. O'Brien
and Harvey B. Jackson*
Attorneys Sept. 21, 1954   C. W. BRANDON   2,689,461
METHOD AND APPARATUS FOR THE STORAGE, REFRIGERATION, AND
TRANSPORTATION OF VOLATILE LIQUIDS AND OTHER FLUIDS
Filed July 16, 1948   10 Sheets-Sheet 9

Clarence W. Brandon
INVENTOR.

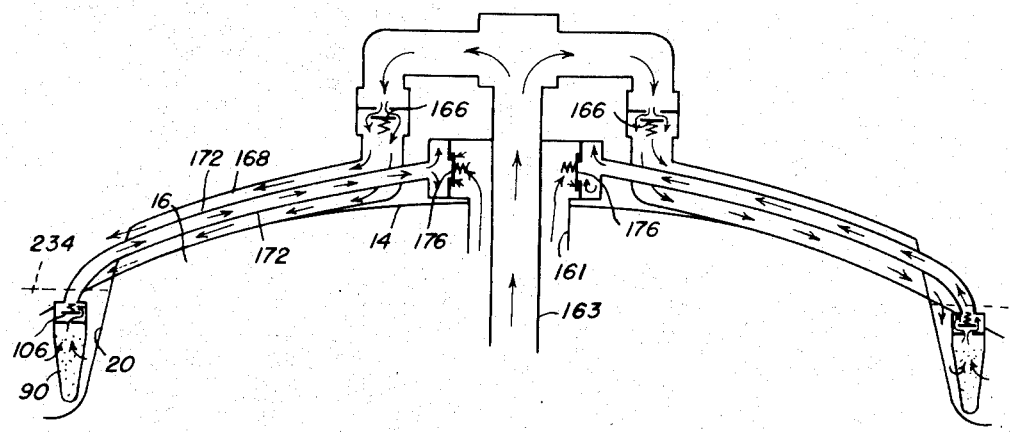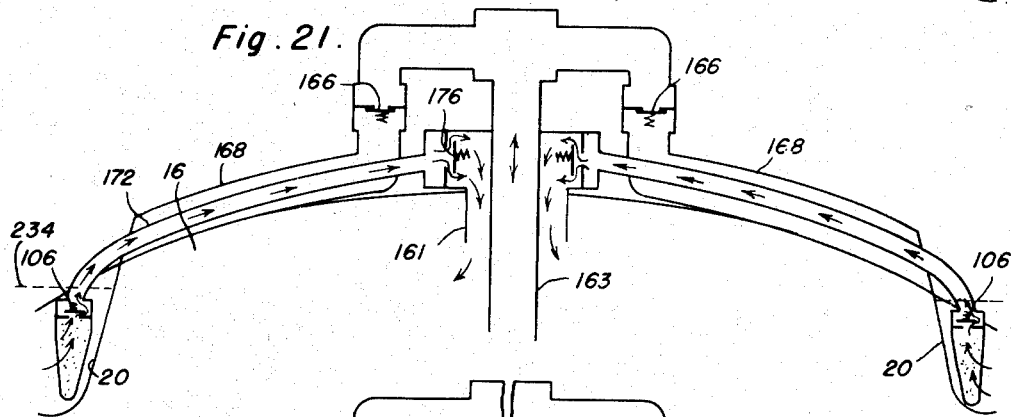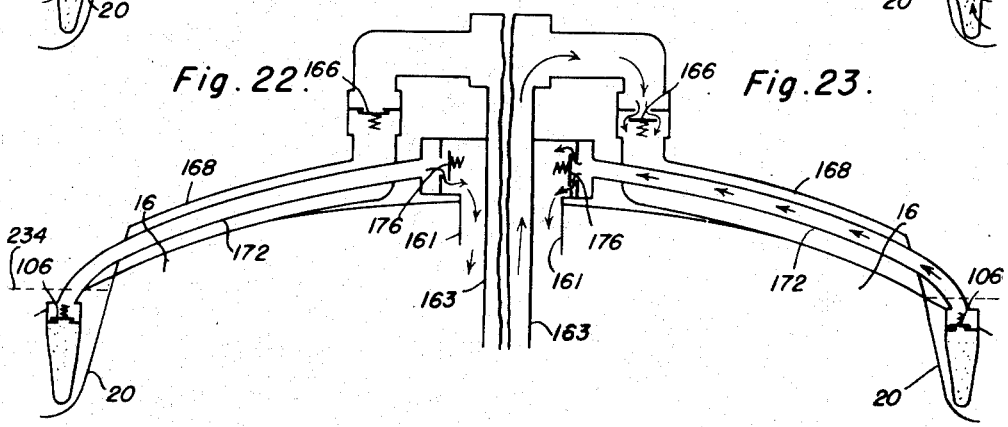

Patented Sept. 21, 1954

2,689,461

UNITED STATES PATENT OFFICE 2,689,461

METHOD AND APPARATUS FOR THE STORAGE, REFRIGERATION, AND TRANSPORTATION OF VOLATILE LIQUIDS AND OTHER FLUIDS

Clarence W. Brandon, Tallahassee, Fla., assignor, by direct and mesne assignments, of fourteen and one-sixth per cent to N. A. Hardin, fourteen and one-sixth per cent to Hazel E. Wright, fourteen and one-sixth per cent to Catherine H. Newton, all of Forsyth, Ga., and fifteen per cent to Harvey B. Jacobson, Washington, D. C.

Application July 16, 1948, Serial No. 39,154

39 Claims. (Cl. 62—1)

This invention relates to novel and useful improvements in a method and apparatus for the storage, refrigeration and transportation of volatile liquids and other fluids, and more particularly has reference to a method and apparatus for improving the transportation and storage of such fluids with particular attention to reducing excessive pressures and temperatures generated in fluids which are confined in containers and are exposed to external sources of heat. Although not limited to this field, my invention finds a special utility in its application to a method and apparatus for efficaciously confining highly volatile liquids such as liquefied petroleum gases, ammonia or the like in tanks such as barges or land vehicles for transporting such liquids.

In its simpler aspects and broadest principles, the present invention represents an improvement upon and relates to somewhat similar subject matter to that disclosed in the prior patent of Clarence W. Brandon and George M. Brandon, Patent No. 2,408,505, patented October 1, 1946.

In the field of transportation and storage of volatile liquids, and especially in the use of tanks or barges which are designed to transport liquid upon water ways, it has been heretofore recognized as essential that the compartment receiving the volatile liquid shall be completely filled in order to avoid the detrimental effects of splashing or shifting centers of gravity of a container which is partially filled and subjected to a rolling or tossing action during transit. Industry has long known that when such tanks are employed as barges or other portable containers and are completely filled with highly volatile or other liquids, and subjected to external sources of heat, such as to the variable temperatures produced by the rays and heat of the sun or the like, the increase in temperature of the liquids which completely fill and are confined in a storage compartment, produce very great increases in the pressures to which such liquids are subjected.

By way of illustration, it may be noted that in one type of barge or tank, which is approximately 90 feet in length and of about 9 feet in diameter, the pressures of the contained liquid where no vapor space is provided, and consequently to which the walls of the container are exposed, may rise from slightly above atmospheric pressure to values of about 450 pounds per square inch, at which pressures rupture of the container is threatened unless pressure relief is provided, these pressures arising directly and solely from the thermo-dynamic expansive forces created in the liquid contents of the tanks by the heat of the sun's rays or the like. Obviously, it has been necessary therefore to employ tanks of very thick metallic plate construction, the example above mentioned usually requiring metal plates of 1⅛ inch in thickness.

It will be apparent that if some means were provided for reducing the pressures generated by the expansion of the liquid contents occasioned by the above-mentioned source, and maintaining the maximum pressures thus generated to predetermined lower and safer limits than would normally occur with no provision for the relief of pressure, the tanks could be of much lighter material with a resultant appreciable economy in the constructing, handling and transporting of the same.

As a primary purpose, the invention aims to provide a tank for receiving volatile liquids which may be of appreciably lighter and more economical construction, yet will be more serviceable in use than conventional containers heretofore used.

Accordingly, it is a fundamental intention of this invention to provide a process and a means for reducing the pressures to which the confined liquids in such tanks are subjected; to utilize the thermo-dynamic forces developed within the body of liquids in such tanks for carrying out the method and actuating the apparatus designed to alleviate the above-mentioned detrimental conditions; and in particular to provide a refrigerating system in which the liquid itself constitutes the refrigerant, whereby the thermo-dynamic forces developed within the confined liquid will cause a circulation of the refrigerated portions of the liquid to thereby lower the temperatures existing in the liquid and hence reduce the thermo-dynamic pressures developed therein; and by further providing an extremely sensitive auxiliary refrigerating system incorporated in the above elements and which shall be periodically and intermittently operated by the thermo-dynamic forces in confined bodies of liquids to effect the above-mentioned functions and purposes.

This invention therefore has for its primary objects the development of improved methods and apparatus for reducing the peak or maximum pressures which are thermo-dynamically generated within confined bodies of volatile liquids.

A further object of the invention is to provide a method and apparatus wherein a portion of the volatile liquid is utilized to produce a refrigerating effect upon the main body of the liquid to thereby lessen the pressures to which the confined body of liquid is subjected.

Still another object of the invention is to provide a method and apparatus wherein the thermo-dynamic pressures generated within a confined body of liquid are utilized to temporarily discharge a portion of that liquid for reducing the maximum pressure to which the confined body of liquid is subjected.

Yet another very important object of the invention resides in the provision of a method and apparatus as set forth in the preceding objects wherein the variations in pressure produced in a confined body of volatile liquid by the influence of varying temperatures thereon, are utilized to effect a cyclic flow of a portion of the liquid out of and back into the confined body of liquid to thus reduce the extremes of pressure to which the confined liquid is subjected.

An additional object of the invention is to provide an apparatus and method in accordance with the preceding object wherein the cyclic circulation of liquid from the confined body is caused to suffer an expansion or drop in pressure during the course of its flow from and back into the confined body, which expansion is utilized to effect a refrigerating action upon the balance of the confined body of liquid.

Another very important object is to provide a very compact, efficient and improved conduit system for circulating a portion of the stored liquid for an efficient refrigerating action upon predetermined areas of the surface of the container, in heat exchange relation with and for cooling predetermined portions of the contents of the tank.

Still another important object of the invention resides in the provision of an apparatus and method as set forth in the foregoing objects wherein the liquid withdrawn from the storage compartment of the tank is removed from the cooler portions thereof, and wherein the circulating refrigerated portions of the liquid are returned to the upper or warmer portions of the storage tank.

A still further intention of the invention is to provide a method and apparatus for effecting a circulation of a portion of the contents of a confined body of volatile liquid from that body of liquid, through a pressure reducing zone and finally discharging that portion of the liquid by means of a spray into an area of low pressure for effecting a cooling effect upon predetermined portions of the confined body of liquid, then collecting the condensate from the pressure expanded portion and subsequently returning the condensate to the confined body of liquid during the next period of relatively reduced pressure therein.

A further and very important object of the invention is to provide a method and apparatus for refrigerating confined bodies of liquids subjected to varying thermo-dynamic pressures therein by withdrawing, circulating and returning a portion of the confined liquids by means of the thermo-dynamic pressures to which they are subjected in the confined body, and by so arranging the course of travel of the withdrawn portion as to subject that portion to the immediate influence of the external source of heat to which the confined body of liquid is subjected in order to thereby obtain a more rapid and hence more sensitive fluctuation of pressure in the withdrawn portion of the liquid and in the confined body with a view to causing a more rapid series of intermittent refrigerating operations upon the confined body of liquid.

Another object of the invention is to provide a method and apparatus as set forth in the foregoing objects wherein provision is made for releasing the pressure upon the confined body of liquid and for venting the same, without loss of liquid or its vapor, to facilitate the loading or unloading of the tank.

A still further object of the invention is to improve the construction of tanks for the storage of volatile liquids for utilization in the foregoing process and apparatus, to augment the safety thereof against damage by fires in the event of collisions or the like.

An important feature of the invention resides in the provision of a storage tank or container which is divided by a partition into a storage compartment for confining bodies of volatile liquids and a vapor compartment, each of these compartments being sealed from the atmosphere, together with conduit means connecting these compartments for selectively effecting a flow of liquid from the liquid compartment to the vapor compartment and for effecting a return of liquid condensate from the vapor compartment into the confined liquid storage compartment.

A further feature of the invention resides in the provision of an apparatus as set forth in the preceding paragraph wherein pressure relief valve means are provided for controlling the flow of liquid through the conduit means from the storage compartment to the vapor compartment, for thereby effecting a reduction of pressure upon the withdrawn liquid for producing a vaporizing and refrigerating effect thereon.

An additional feature of the invention resides in the provision of a tank which is ideally adapted for use as a barge and wherein there are provided blisters upon the sides of the same for improving the stability of the barge, for increasing the constructional strength of the tank, and for assisting in cooling the contents of the same.

Yet another feature of the invention contemplates the construction of a plurality of barges whereby the same may be readily assembled into rafts for more convenient or economical handling, and yet wherein the improved operation and advantages of the blister construction above mentioned may be fully enjoyed and utilized.

Yet another feature of the invention resides in the provision of a barge for the transportation of volatile liquids upon water ways, wherein the blister construction is arranged to overlie a portion of the vapor compartment formed within the barge to effect a greater cooling effect thereon and to thereby improve the refrigerating of the contents of the barge.

Another important feature of the invention resides in the provision of a barge having a lower confined liquid storage compartment and an upper confined vapor compartment, together with conduit means and mechanism for effecting periodic, cyclic circulations of liquid from the cooler portion of the confined body of liquid into the vapor chamber, reducing the pressure upon the liquid so inducted into the vapor chamber to produce a refrigerating effect therein, collecting the condensate of the liquid inducted into the vapor chamber in cooler portions thereof, and subsequently returning the collected condensate into the confined chamber at the hotter portions thereof.

Still another important feature of the invention resides in the provision of a container for volatile liquids having separated liquid storage and vapor compartments, and wherein the vapor compartment is provided with sloping channels or gutters for collecting the liquid condensate therein into a sump together with conduit means for automatically and periodically withdrawing the condensate from the sump in response to pressure variations effected by the thermodynamic action of external sources of heat upon confined portions of the volatile liquid.

A still further feature of the invention resides in the provision of a volatile liquid storage tank wherein the principles of refrigerating and lowering the pressure of confined bodies of liquid as set forth in the preceding objects and features are incorporated, which tank is modified for use as a land transport for volatile liquids.

These, together with various ancillary objects and features of the invention, which will later become apparent as the following description proceeds, are attained by this invention, preferred embodiments of the methods and apparatuses of which have been illustrated, by way of example only of the principles thereof, in the accompanying drawings, wherein:

Figure 2 is a side elevational view, parts being broken away, of the embodiment of Figure 1, and is taken substantially upon the vertical longitudinal plane of the section line 2—2 of Figure 5;

Figure 3 is an end elevational view of a modification of the principles of the invention illustrating the manner in which a plurality of tanks may be rigidly connected to form a raft, and showing a modified blister construction of the tank units which is particularly adapted for use in the raft arrangement, together with cross and catwalk connections therebetween;

Figure 6 is a fragmentary vertical longitudinal sectional detail view, parts being broken away and taken substantially upon the plane of the section line 6—6 of Figure 1, and illustrates further interior details of construction and arrangement of the embodiment of Figure 1;

Figure 1:
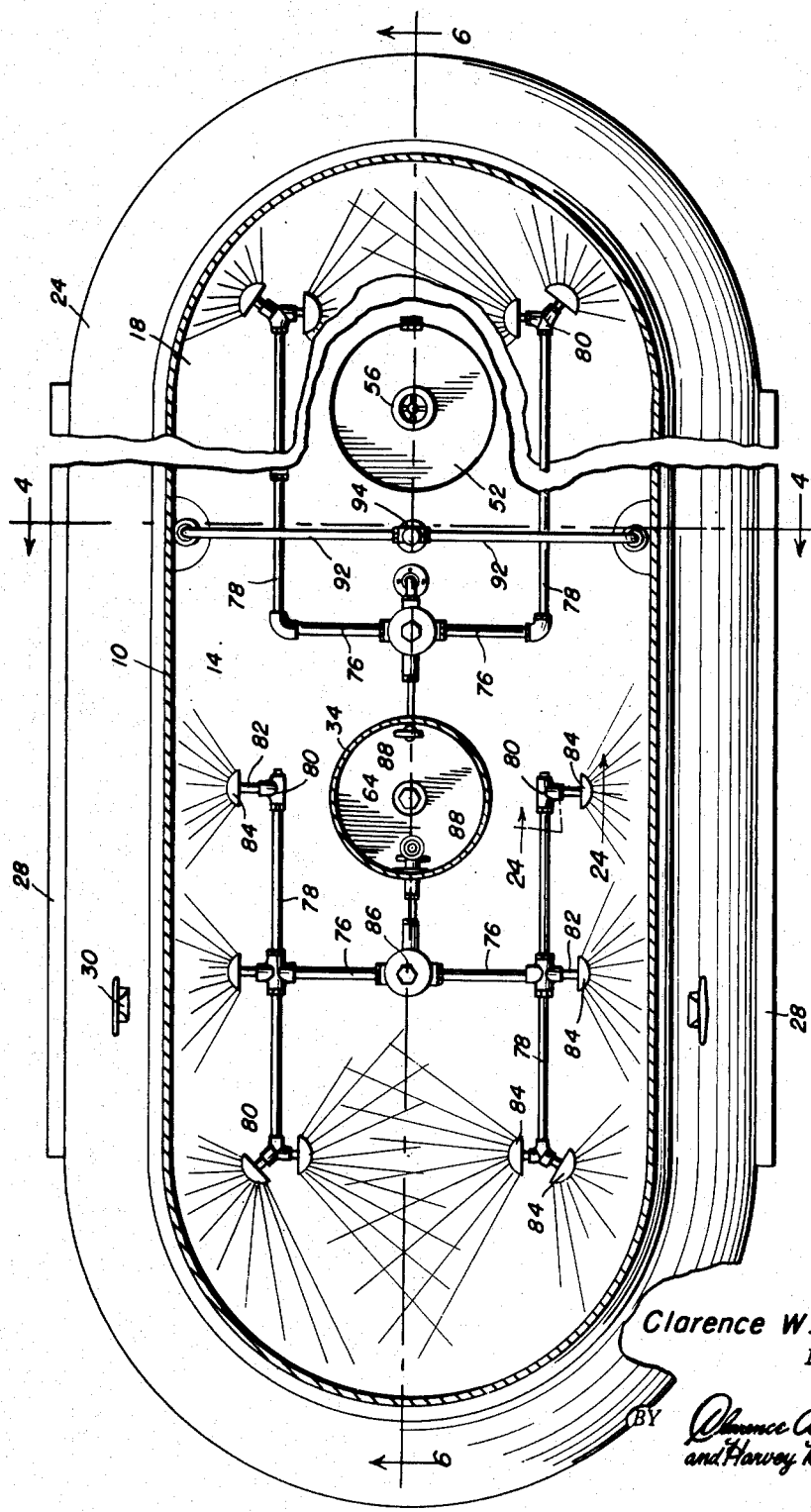
Figure 1 is a substantially horizontal sectional view taken substantially upon the plane of the broken section line 1—1 of Figure 4, through one embodiment of the invention and illustrates in plan form, a suitable conduit arrangement for effecting the basic purposes of the invention.
Figure 8:
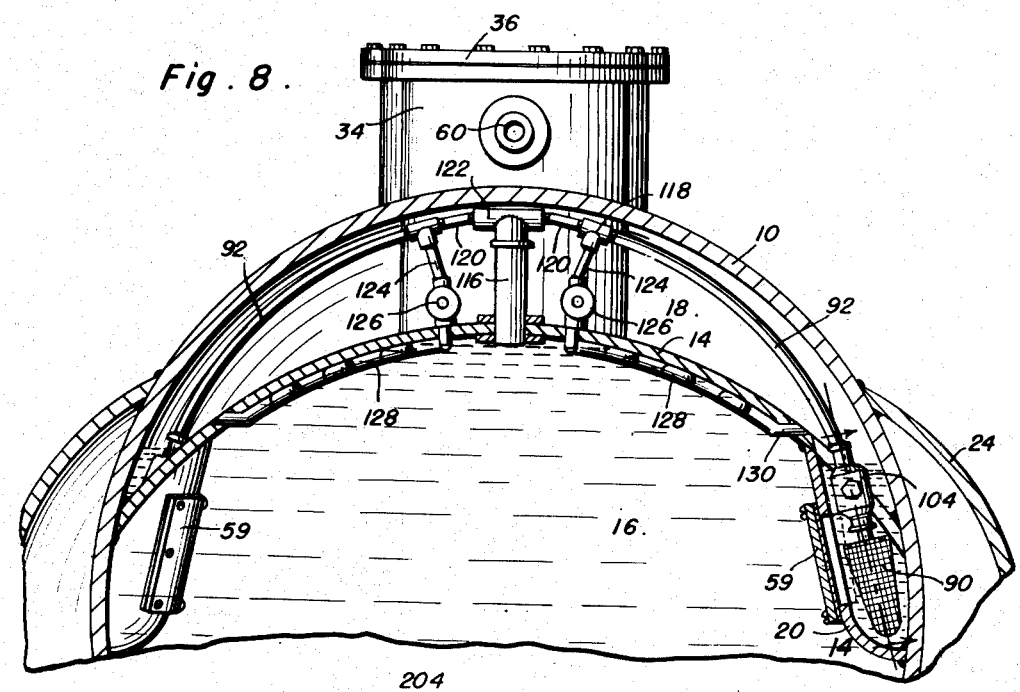
Figure 9:
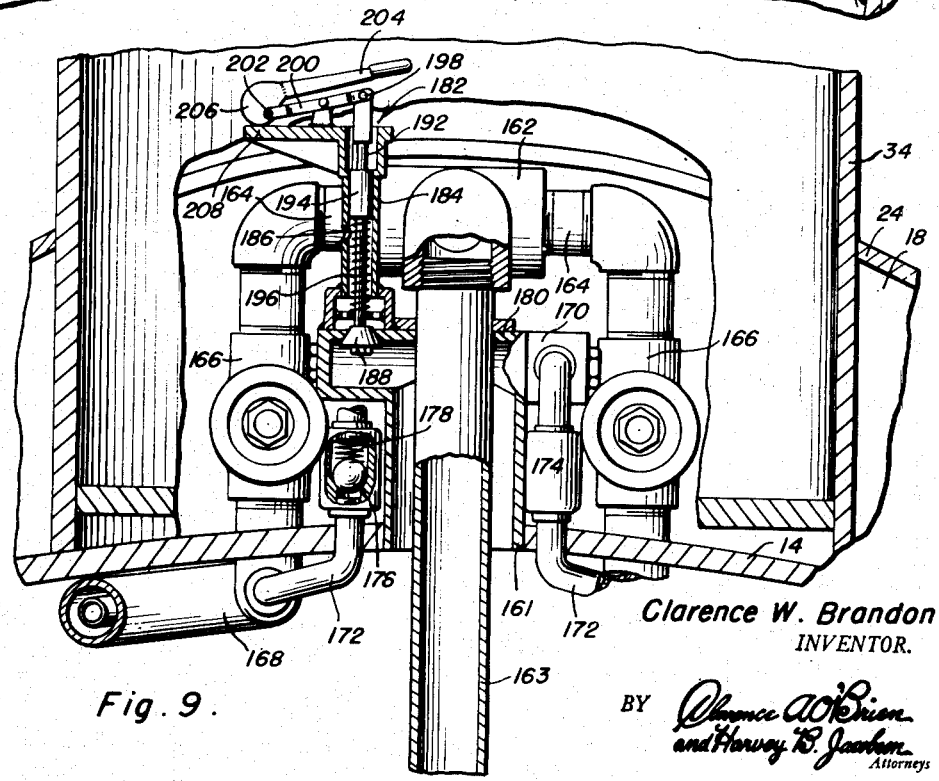
Figure 18:
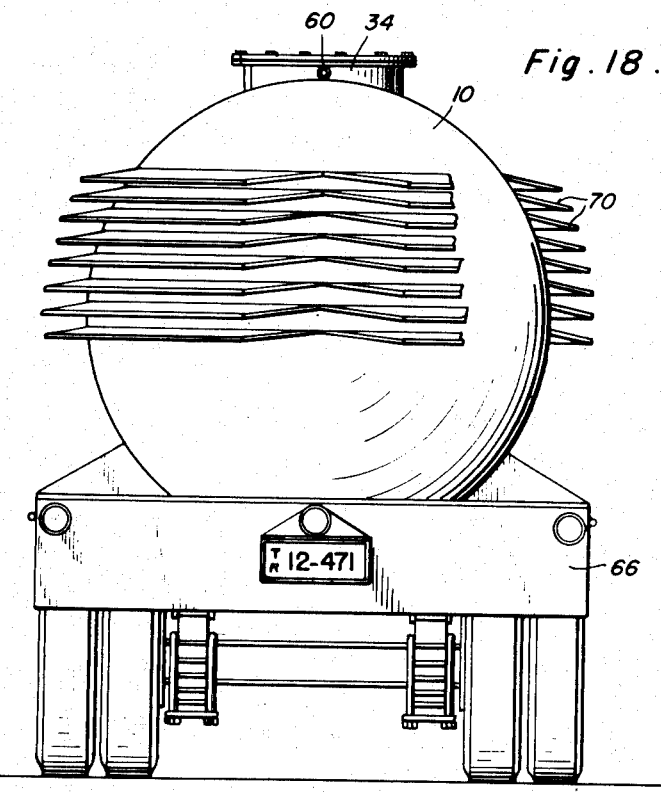
Figure 19:
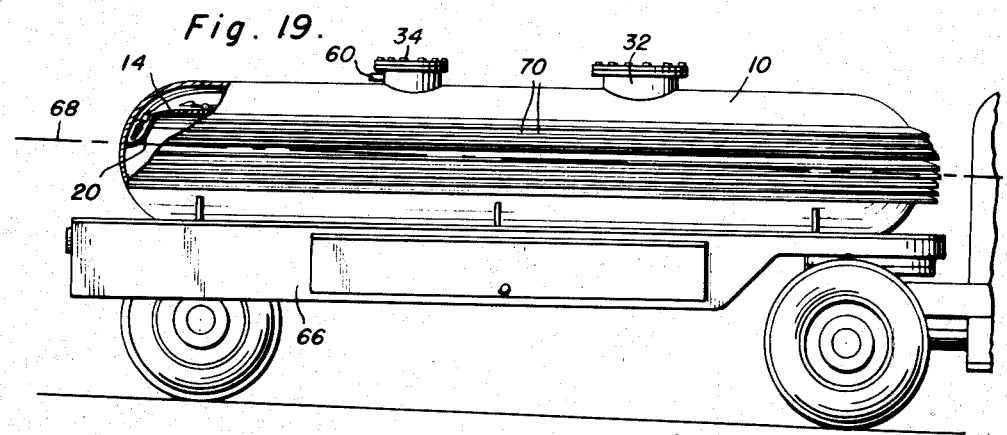

Figure 7 is a vertical longitudinal sectional view, similar to Figure 6, but showing a further modified construction of tank in accordance with the principles of the invention, this arrangement disclosing the location of the condensate sump at the coolest portion of the storage compartment for realizing the maximum cooling effect upon the collected condensate prior to its return to the confined storage compartment;

Figure 8 is a fragmentary view taken in transverse vertical section substantially upon the plane of the section line 8—8 of Figure 2 but showing a further modified construction of the circulating, refrigerating conduit system in accordance with the principles of the invention;

Figure 9 is an enlarged detail view taken in vertical section and showing certain structural details of the construction and arrangement of the refrigerating conduit system of Figure 13 and particularly illustrating a combined condensate return valve and pressure release valve employed with the invention;

Figure 10 is a vertical transverse sectional detail view, parts being broken away and showing the interior construction and arrangement of a further modification of the tank in accordance with the invention, this view being taken substantially upon the plane of the section line 10—10 of Figure 7;

Figure 11 is a fragmentary view, similar to Figure 10 but showing still further modifications of the cooling means, and auxiliary cooling means housed in the blister construction and is taken substantially upon the plane of the section line 11—11 of Figure 2;

Figure 12 is a fragmentary horizontal sectional view showing a satisfactory arrangement of the spray nozzles in the vapor compartment, taken substantially upon the plane of the section line 12—12 of Figure 10;

Figure 13 is a vertical transverse sectional detail view of a further modified construction of the invention, and shows in particular a fire prevention safety system which may be incorporated in the blister construction of the device together with a modified form of the cooling conduit system;

Figure 14 is a fragmentary sectional view taken substantially upon the plane of the section line 14—14 of Figure 8 and illustrating the construction of a strainer and inlet valve forming a part of the return system of the invention;

Figure 15 is a substantially horizontal sectional view taken substantially upon the plane of the broken section line 15—15 of Figure 13 and illustrating in plan the arrangement of the recirculating, refrigerating and return conduit system forming a part of the embodiment of Figure 13;

Figure 16 is a detail view taken in a vertical longitudinal section substantially upon the plane of the section line 16—16 of Figure 15 and illustrating the construction of the combined expansion and vent valve incorporated in the device;

Figure 17 is a sectional detail view taken substantially upon the plane of the section line 17—17 of Figure 16;

Figure 18 is a rear elevational view of a further embodiment according to the principles of the invention and illustrates an arrangement for mounting the storage tank upon a portable support as a truck or the like;

Figure 19 is a side elevational view, parts being broken away to show the interior construction thereof, of the embodiment of Figure 18;

Figures 20–23 are diagrammatic views illustrating the method and steps of operation of the recirculating and refrigerating system forming a part of the invention; and Figure 24 is a detail sectional view taken substantially upon the plane of the broken section line 24—24 of Figure 1 and illustrating a suitable construction of deflector or baffle forming a part of the refrigerating spray system of the invention.

Reference is now made more specifically to the accompanying drawings for an understanding of the principles of construction and features of operation of the various embodiments of the invention, like numerals indicating similar parts throughout the various views.

*Frame construction of tank*

Attention is first directed to various suitable constructions of tanks in conformity with the principles of this invention together with the manners and arrangements for combining such tanks into rafts or units for more efficient or economical control of the same.

There is disclosed in Figures 1, 2, 4 and 5 a modified practical embodiment of tank, formed as a barge, in accordance with the basic concept of this invention. Although it is to be understood that the tank may be of various shapes and proportions, and is not to be limited to that illustrated, a satisfactory embodiment may consist of a cylindrical elongated casing or container 10 having spherically rounded end portions 12, this tank being of metallic plate or the like, although any suitable material may be employed having the requisite strength.

Within the tank 10, and preferably although not necessarily extending throughout the entire length thereof, is a partition 14 which divides the tank into a lower compartment 16 constituting a storage chamber for receiving and containing volatile liquids therein, and an upper compartment 18 comprising a vapor chamber. As will readily be understood, the chambers 16 and 18 are completely sealed from each other by means of the partition 14, and preferably comprise pressure-tight chambers.

In this embodiment of the invention, it will be seen that the partition 14 is shaped as an arcuate plate having its concave surface forming a part of the wall of the volatile liquid storage chamber 16, while its convex surface forms a part of the wall of the vapor chamber 18. The vapor chamber 18 is thus crescent shaped in vertical transverse cross section and ellipsoidally-shaped in horizontal cross-section.

It will thus be seen that the convex surface of the partition 14 constitutes the bottom wall or floor of the vapor chamber 18, and slopes from the center toward both sides thereof, and the junction of the partition 14 with the tank 10 thus provides a continuous trough or channel, functioning as a sump, about the marginal edge of the partition 14.

In some instances, this trough or channel will be found sufficient for the purposes desired; but it is preferred to accentuate such trough or channel by providing a depressed portion or portions 20 which constitute sumps for collecting and receiving vapor condensate therein as set forth hereinafter. If desired, these sumps 20 could extend around the entire periphery of the partition 14, or alternately could be provided at predetermined spaced positions thereon. Moreover, the lower surfaces of those portions of the troughs or channels which define the sumps 20 will preferably slope upwardly from the sides of the sumps to the junction of the partition 14 with the tank 10, whereby ready collection and drainage of any vapor condensate within the compartment 18 will be effected and such condensate will be conducted to the lowermost portions of the sumps 20.

A conduit system to be specifically set forth hereinafter is provided for establishing controlled communication between the storage chamber 16 and the vapor chamber 18. It is contemplated that the storage chamber 16 shall be filled at all times with the volatile liquid to be transported, said body of liquid completely filling the chamber 16 and being confined therein. The curved walls of the chamber 16 thus are ideally adapted to offer the maximum strength for retaining the confined liquid and the pressures generated therein by the thermo-dynamic action upon the confined liquid of varying increases in temperature effected by the sun's rays upon the tank or by other external sources of heat. It is intended that when the tank is constructed as a barge as illustrated in this embodiment of the invention, that the continuously completely filled storage compartment 16 and the vapor chamber 18 thereabove will be immersed into water to an extent indicated by the water line or level 22.

In order to promote the stability of the barge when the same is immersed in the water, a blister construction is secured thereto as by welding or in any other manner. This blister construction consists of an arcuately shaped casing 24 which is secured to the tank 10 as by welding 26 or the like, and thus defines convex extensions protruding laterally from the walls of the tank 10.

I may prefer in some instances to extend this blister 24 as a continuous casing around the entire circumference of the tank 10, as shown in Figures 1, 2, 4 and 6, but in some instances I may prefer to provide the blister as a series of spaced casings on one or both sides of the tank 10, at either or both ends thereof, in accordance with the dictates of the use which is contemplated.

It is contemplated that the blisters or sponsons 24 will provide greater buoyancy for the barge, will improve the stability of the same against rocking or rolling as in heavy seas, will reinforce and strengthen the side walls of the barge, and will serve other purposes as set forth hereinafter.

The uppermost junction of the blister 24 with the wall 10 will preferably be below the normal water line 22 of the loaded tank, but will overlie the line of junction of the partition 14 with the wall 10, whereby the top of the blister will constitute a shield or screen which will tend to shade the sumps 20, and the vapor condensate collection troughs or channels from the direct heating effect of the sun's rays or the like, and will further insulate the storage compartment from the heating effects of the relatively warmer, upper layer of water in which the tank is immersed, to thus assist in producing a cooling effect upon these troughs, channels and the sumps 20. It should be here noted, and this principle is advantageously employed by this invention, that the temperature of open bodies of water even a slight distance below the surface remain at a relatively cooler and less rapidly variable temperature than the surface layer. Consequently, in a barge immersed therein, the lower portion of the barge and its contents will be substantially cooled relative to its upper portion.

Preferably secured as by welding or the like to the outer surfaces of the blisters 24, are rub rails 28 of any desired construction but preferably having vertical surfaces which act as buffers to shield and protect the blisters and hence the sides of the tank 10 from damage as by collision or the like, and which further serve as abutment surfaces for securing a plurality of tanks together as set forth hereinafter, and for any other desired purpose. Secured to the blisters 24 at any desired locations thereon as by welding or the like, are cleats 30, see Figure 2, by means of which suitable cables may be attached to the barge for anchoring or moving the same. It should be here noted that the location of the cleats upon the blisters is a desirable feature in that the strains transmitted to the tank 10 by the cleats are thus distributed by means of the blisters 24 over a wider surface of the tank whereby the tank may be of much lighter construction than if the cleats were directly attached thereo.

Surmounting the top surface of the tank 10 is a plurality of domes, any desired number being provided, two being indicated by the numerals 32 and 34, these domes conveniently but not necessarily consisting of tubular members secured to and passing through the upper surface of the tank 10 and extending thereabove to be provided with detachable closures or covers 36 of any desired construction. Preferably one of these domes, such as that indicated at 32 in Figure 6, provides a means for obtaining access to the vapor compartment 18, and to the mechanism housed therein; while another of the domes, such as that indicated at 34, extends through the vapor compartment 18 and is attached to the partition 14 to provide a well or other chamber containing various control means for the mechanism with which the barge is provided.

It is, of course, to be understood that it is within the purview of this invention to contour the blisters at the front or rear of the barge tanks in any desired manner to facilitate and improve the operation of the tank as a barge, as by forming a prow, a stern, a rudder or the like thereon.

Figure 5:
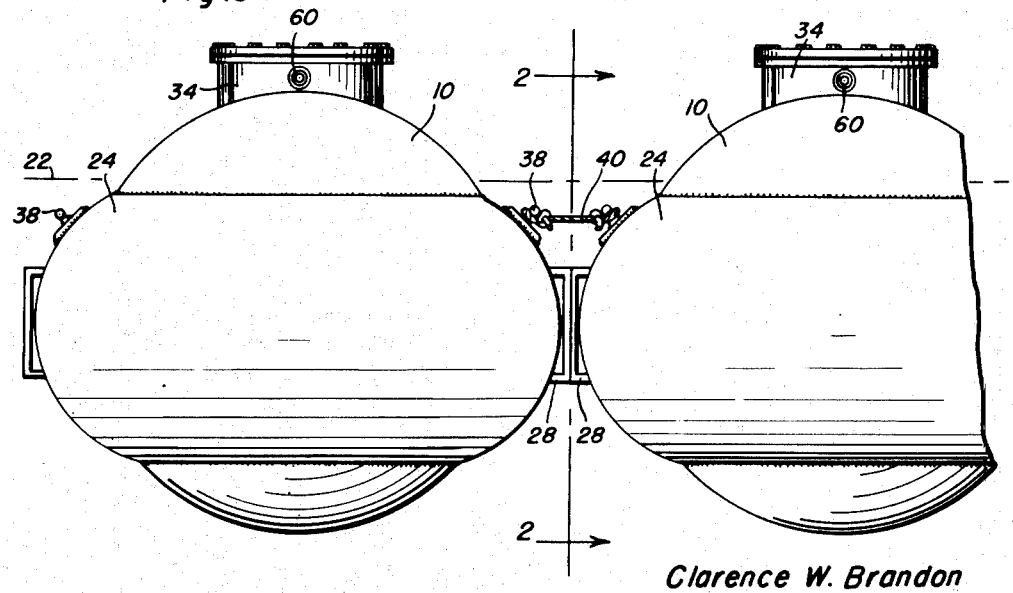
Figure 5 is an end view of a modified arrangement of the tanks to form a raft, disclosing an alternative manner of coupling or fastening a pair of tanks together for operation as a unit in the form of a raft or barge.

As shown by Figure 5, the construction hereinbefore described is ideally adapted for the temporary assemblage of a plurality of tanks to form a raft or the like by merely securing two tanks together with their rub rails 28 in juxtaposition or abutment, and by securing adjacent cleats 30 as by means of cables or other lashings or fasteners 40 whereby an assemblage of tanks may be maneuvered or operated as a unit.

Reference is now made to Figure 3 showing a modified construction which may be employed when it is desired to assemble three or more barges in rigid side by side relation to form a unitary assembly. In this arrangement there are shown three tanks 10 which may be of the construction set forth hereinbefore, except as to the blister arrangement thereon. Here, if desired, the innermost tank may have the side blisters omitted therefrom, while the two outer tanks have blisters omitted from their inner sides but have their outer sides provided with blisters 24 and rub rails 28 thereon, the sterns of the barges being contoured as at 42 to provide tapering rudder-like constructions, it being understood that the forward ends of these tanks may be suitably contoured to provide prows or the like.

The innermost barge or tank 10 is provided upon both of its side surfaces, and the two outer tanks are provided upon their inner side surfaces with laterally extending aligned bosses or projections 44, which are rigidly connected together as by struts 46 and cross braces 48 to rigidly secure the individual tanks together into a unitary assembly, and suitable catwalks or the like 50 may be provided upon the uppermost of the struts 46 whereby access may be obtained to the various tank units of the assembly.

Obviously, the teaching of Figure 3 for rigidly combining a plurality of tanks into an operative unit, includes the use of the two side tanks only in juxtaposition as well as the use of a plurality of intermediate tanks therebetween; and further envisions tanks in longitudinally aligned and abutted relation.

Attention is now again directed to Figure 6 wherein it will be seen that the partition 14 is provided with suitable covers 52 which are hinged as at 54 for controlling manholes in the partition by means of which access may be obtained to the interior of the storage compartment 16, these hinged manhole covers being provided with locking means such as a locking wheel 56 of any known and suitable construction. Obviously, any desired number of these manhole covers may be provided throughout the length of the partition 14. It is to be understood that this construction may be employed in any of the various embodiments of the invention disclosed and set forth hereinafter, as desired.

Figure 4:
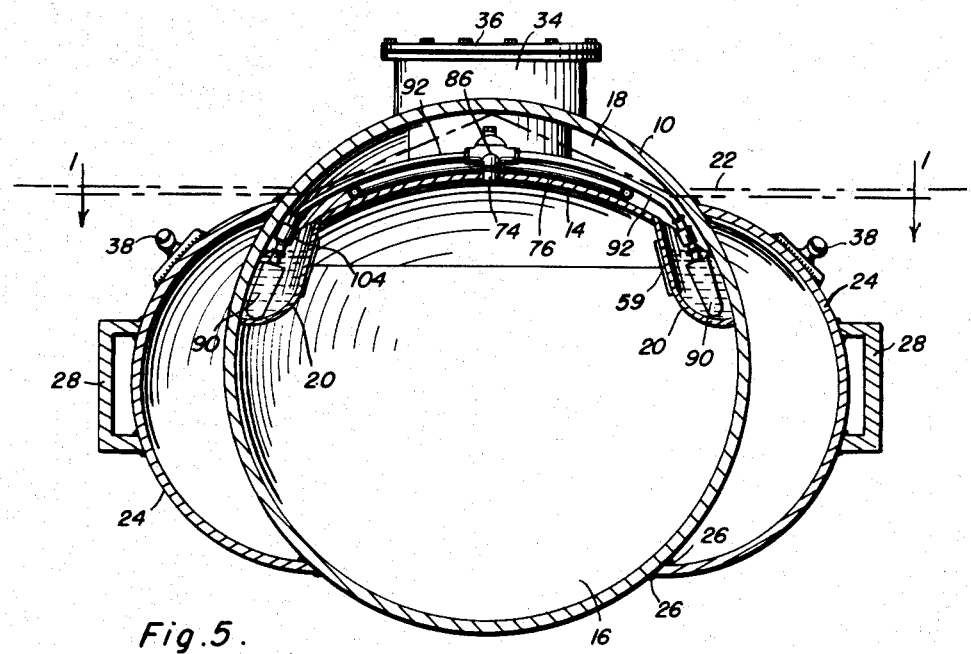
Figure 4 is a vertical transverse sectional detail view taken substantially upon the plane of the section line 4—4 of Figure 1 and shows the interior construction and arrangement of the components of the tank illustrated in Figure 1, and in particular shows the blister, rub rails, spray sumps and some of the refrigerating conduit system of the invention.

Further, as shown in Figure 4 and more clearly in Figure 8, the sumps 20 may be provided with detachable covers or closure plates 58 likewise of any suitable design, by means of which access may be had to the sumps 20 for inspection or cleaning the same, from the interior of the compartment 16.

A pressure relief or safety device means is provided for preventing the attainment of a pressure in the vapor chamber 18 above a predetermined desired safe maximum pressure, and for this purpose, as shown in Figure 6, there is provided a conduit 59, extending through the tower 34 into the interior of the vapor compartment 18, which conduit has an outer end 60 extending through the upper wall of the tower 34 into free communication with the atmosphere, a suitable pressure relief valve 62 of any desired construction being included in the conduit and preferably positioned within the well defined by the tower 34 for easy access thereto for inspection, repairs or adjustment of the valve as desired. By this means, provision is made for preventing the pressure within the vapor chamber 18 from exceeding a predetermined value for which the valve 62 is set. Also indicated in the tower 34 is a plug 64 affording communication to the interior of the storage compartment 18 for filling or withdrawing liquid as desired.

As shown in Figures 18 and 19, the storage tank may be adapted for use as a land transportation vehicle by mounting the same upon a wheeled truck or chassis such as that indicated at 66, which chassis may constitute part of a trailer or a motor truck, may consist of a railway tank car or the like. When so used however, the tank 10 is mounted thereon in such position that the tank 10 is longitudinally inclined relative to the horizontal plane indicated by the reference line 68, so that the partition 14 of the tank will slope downwardly toward one end, which may be its rear end, toward the sump 20 thereof. In this arrangement, any condensate collecting upon the troughs or channels at the edges of the partition 14 will thus drain toward the sump 20 at the lower end thereof. In this arrangement, the blister construction previously described and used with respect to the barge arrangement is impractical with respect to land vehicles, and the same may conveniently be replaced by the lateral fin arrangement indicated at 70 in Figures 18 and 19.

These, of course, may extend entirely around the sides of the tank, or may extend over only predetermined portions thereof as desired, and constitute a means for providing air cooling fins which may assist in providing a cooled zone in the tank and also provide a shielding means for sheltering a portion of the tank from the direct rays of the sun or the like. As in the other embodiments, this cooling zone preferably overlies the pockets or collection channels or troughs 20, to provide a decided cooling effect for this region. It is to be understood that the tank 10 in the arrangement of Figures 18 and 19 may include any and all of the features previously described with respect to the construction of the storage tanks. Further, these tanks are to be understood as including the refrigerating means to be hereinafter described, if the same is desired.

It is to be understood that in the previously described embodiments of barges, that the blisters 24 are intended to be immersed below the water line when the barge is loaded, whereby the blister as well as the rest of the immersed walls of the tank will be water cooled, and this water cooling effect may be supplemented or if desired may in some instances be replaced by any other cooling means desired, such for example, as by a coolant circulating system indicated in Figure 11. In this arrangement, the blister 24 is provided with a plurality of lengths of pipes or coils 72, through which a coolant may be circulated by any desired means. It is to be understood that these cooling coils 72 may extend entirely about the tank 10 within the blisters 24, or if desired may extend throughout only predetermined portions of the blisters and upon predetermined areas of the tank. These coils may be mounted in any desired manner and may constitute a substitute for the cooling effect of the water in which the barges have been heretofore described as immersed, or as a supplement thereto. Obviously, if such a tank is mounted upon supports out of the water, other cooling means could be employed.

*Cooling fluid circulating and pressure release mechanism*

It will be evident that when the volatile liquid storage compartment 16 is completely filled with liquid in accordance with conventional practice during the transportation or storage of liquids in tanks such as those with which the present invention is concerned, that when the temperature to which the confined liquid is subjected is increased, there is a corresponding pressure increase upon the confined liquid, since there is no space for expansion within the storage compartment 16, and since the metallic walls of the same are of negligible expansive qualities. Obviously, if some means were not provided for decreasing the presssures thermo-dynamically generated within the confined liquid, dangerous pressures would soon be reached which would threaten the rupture of the tank which would be attended by various hazards. In accordance with the basic concept of this invention, means are provided for first, withdrawing some of the contents of the storage compartment 16 for directly lowering the pressure thereof, second, utilizing the pressure drop of the withdrawn portion of the contents to produce a refrigerating effect which will tend to further lower the temperature and thus further reduce the pressure of the confined liquid within the compartment 16, and third, when the contents of the storage compartment 16 have relatively cooled so that the remaining liquid therein would be subjected to a sub-atmospheric pressure or a relatively reduced pressure below normal upon cooling of the tank, to re-introduce the withdrawn portion of the liquid to restore or equalize the pressure within the compartment 16 to its original value.

Attention is now directed to the embodiment of Figures 1, 4, wherein a simplified embodiment of the principles of the invention has been illustrated. One or more outlet conduits 74 extend through the partition 14, the lower ends of these conduits communicating with the interior of the storage compartment 16, and the outlet conduits 74 are preferably disposed along the longitudinal center line of the partition 14, at one or more points along the length thereof as found to be expedient. As will be best seen by reference to Figure 1, each of these conduits 74 is provided with oppositely extending pipes 76 to which are secured parallel, longitudinally extending headers or manifold pipes 78, each of which is provided with a plurality of couplings or fittings 80 having spray nozzles 82 secured thereto, provided with deflector or baffle plates 84 on the ends thereof as shown in Figure 24. Obviously, the necessary piping or conduit system may be arranged in various ways, in order to obtain any satisfactory number of spray nozzles, positioned to direct their spray over any desired area or portion of the partition 14. Preferably, the piping system is disposed in either direct contact with or in any event in intimate heat exchange relation with the upper surface of the partition 14, and the spray nozzles and deflectors are positioned to direct the spray to cover any desired portion of the partition but preferably to direct the spray toward the collection troughs or channels having the sumps 20. In the arrangement shown in Figures 1 and 4, it is understood that the conduits 76 and 78 are in direct contact with the upper surface of the partition 14, in such manner that the transverse pipes 76 extend substantially across the partition 14, with the longitudinally extending manifolds or headers 78 disposed parallel to and adjacent the collection troughs formed by the above mentioned junction of the tank 10 with the edges of the partition 14.

A pressure reduction valve 86 is associated with each of the outlet conduits 74 and may be conveniently located at the junction of the same with the transverse pipes 76. These pressure release valves may conveniently be disposed adjacent the tower 34, whereby control wheels 88 may be positioned within the tower 34 for convenient manipulation of all of the valves 86 for manually opening the same as desired. In this connection it is observed that it is contemplated in this invention to open the valves 86 in order to vent the interior of the storage compartment 16 to the vapor chamber 18 through the above mentioned conduit system, in order to reduce the pressure of any trapped vapor in the storage compartment 16 when the latter is being filled with fluids.

Preferably, the pressure release valves 86 are spring loaded to maintain a desired pressure within the storage compartment 16, so that when this pressure is exceeded by the above-mentioned thermo-dynamic action of temperature upon the volatile liquids within the storage compartment, the rising pressure will force a portion of the liquids through the outlet conduit system, through the spray nozzles and discharge the same into the vapor compartment 18.

It is very important to here observe that as this flow of a portion of the volatile liquid is effected from the storage compartment 16 under the influence of the rising pressures therein which exceed the pressure for which the release valves 86 have been set, the discharging liquid in passing the spring-loaded pressure relief valves will be subjected to a pressure drop or will be expanded in its travel through the following conduit system. As is well known, fluids when subjected to a diminution of pressure and expanded are refrigerated or chilled thereby, and the present invention makes use of this pressure drop of the discharge or withdrawn fluids to effect a refrigerating or cooling action upon the tank.

In the arrangement shown in Figure 1, it will be observed that the piping and spray system is such as to cover substantially the entire area of the partition 14 with the discharged or withdrawn portion of the volatile liquid passed through the spray nozzles. Of course, various arrangements of conduits and spray nozzles could be employed to confine the spraying and cooling action to any desired portions of the partition 14. It should be here noted that the discharging portion of the volatile liquid passing through the conduit system will be at least partially vaporized by the release in pressure, so that in practice vapor and/or liquid under reduced pressure will be discharged into the vapor chamber 18 and since the latter is sealed, will thereby produce a pressure therein which, however, will be less than the pressure then prevailing in the storage chamber 16 when the contents of the latter are at an elevated temperature, but will vary with respect thereto as occasioned by the action of the pressure release valve 86, and as set forth hereinafter in the operation of the circulating refrigerating system.

As will be further understood, the magnitude of the cooling action can be somewhat proportioned or regulated by properly adjusting the differences in pressure maintained in the storage compartment 16 by the loading of the pressure release valve 86 and the pressure maintained as a maximum in the vapor compartment 18 by means of the safety release valve 62.

After the liquid has been expelled from the storage compartment 16 by the above mentioned rise in pressure therein caused by the inflow of heat into the storage compartment from an external source of heat, such as the sun's rays or the like, the vapor and liquid expelled into the vapor compartment after effecting the above mentioned cooling action as a result of their reduction in pressure, are condensed and collected upon the partition 14, and flow by gravity toward the troughs or collection gutters and channels defined between the partition 14 and the tank 10, eventually collecting in the sumps 20. The condensate and liquid so collected, it will now be noted, are stored below the water line 22 and below the shielding protection of the upper end of the blister 24 as above mentioned. Thus, the condensate and liquid are accumulated in a zone which is additionally cooled by its location, as well as by the protection of the upper portion of the blister 24.

As will be evident, the ejection of a portion of the contents of the tank 16 will thus serve to reduce the pressure rises created in the storage compartment as the liquid contents thereof are expanded by heat, and the pressure rise therein is further alleviated by the refrigerating or cooling action which converts the pressure drop of the expelled liquids in the vapor chamber into a heat absorbing medium for thereby cooling the partition 14 and hence the upper portion of the contents of the storage tank 16 which immediately underlies the partition. As will be seen, it is the upper portion of the tank which is subjected to the greatest effects of the temperature rise of the confined liquids, and hence the refrigerating action is thereby most efficiently applied.

However, after the reduction of pressure in the storage compartment 16 by the above mentioned means, and after the temperature of the storage compartment is lowered, there is also a contraction of the liquid confined therein, whereby the pressure of the remaining portion of the confined volatile liquid drops below the original pressure and that of the vapor compartment 18. At this time, the pressure within the compartment 16 is definitely below the pressure existing in the vapor chamber 18 into which a portion of the contents of the tank 16 were expelled at the peak pressure of said storage tank. In order to relieve the reversal of stresses which would occur in the wall construction of the tank 10 and its compartments, a liquid return flow conduit is provided for automatically returning the condensate and liquid collected in the sumps 20 into the interior of the compartment 16. This return conduit system includes valved inlet members 90 disposed in the sumps 20, and which are connected by return conduits 92 which return conduits 92 are connected to a fitting 94 as shown in Figure 6 and from thence by means of a return conduit or pipe 96 extending through the partition 14 into the storage compartment at the upper portion thereof and into the area or region which is most subjected to the external heating source. Thus, the cooled liquids, refrigerated both by the reduction of pressure thereon as well as by their collection and storage in the cooled sumps or zones beneath the overlying blister construction, are returned to the hottest portion of the contents of the storage compartment for effecting a lowering of the temperature and hence of the pressures therein.

As shown in the enlarged detail view of Figure 14, the inlet means 90 preferably consists of a housing or casing which may be generally pear-shaped, and is provided with apertures 98 therein, being covered as by a screen 100, this casing being disposed near the bottom of the pockets or sumps 20. This casing is threaded upon one end of a nipple 102 whose upper end is secured to a valve casing 104, which, in turn, depends from the screw-threaded end of the return pipe 92. The valve casing is preferably provided with a suitable check valve 106, which is illustrated as being of the well known ball construction and closed by means of a spring 108 against a seat formed in the lower end of the casing 104, to thereby permit flow into the pipe 92 from the casing 99, but to prevent return flow. As will be readily understood, various forms of check valves may be employed for this purpose, such as flap valves, or the like. Moreover, the influence of gravity may be relied upon to close the valve, but it is preferred to substitute or assist in this closing action by means of a spring such as that shown.

The valve casing 104 may be provided with a removable plug 110 to obtain access to the same for inspecting, repairing or servicing the check valve as necessity requires.

Attention is next directed to Figure 24 wherein there is disclosed a suitable embodiment of deflector or baffle 84 which may be employed upon the spray nozzles 82 for effectively directing the spray or liquid discharged therefrom to the desired area. As will be seen, the tube or pipe constituting the nozzle 82 has secured at the outlet end thereof a plate or disk 112, provided with a tapering orifice 114 aligned with the passage in the pipe 82, the direction of the orifice 114 being such as to direct the emerging vapor or liquid at an angle with respect to the axis of the nozzle 82, to thereby cause the same to impinge upon the reflecting or baffling surface of the baffle 84. The latter as shown constitutes a curving shield or baffle which is open at its lower edge to deflect the emerging liquid or spray vapor as indicated by the direction lines in Figure 24. By this means, the emerging fluid is diffused and spread over a predetermined area for distributing the cooling effects thereof.

Obviously the cooling effects and the advantages obtained thereby may be realized by providing the discharge conduit pipe system, whether consisting of lateral pipes with longitudinally extending headers, or a complete network of courses or convolutions of pipe, may be disposed within the storage compartment 16 in intimate or in direct heat exchange relation with the undersurface of the partition 14, instead of in the vapor compartment 18 as above mentioned. This latter arrangement is indicated in Figure 8. In this arrangement, the same identical fluid return conduit system previously described may be employed, such system including the inlet strainer members 90, disposed in the sumps 20, and having the valve casings 104 and return conduits 92 together with their return conduits or pipes 96 communicating with the interior of the compartment 16 immediately below the highest point of the partition 14.

The return conduit system is somewhat similar to that of Figures 1, 2, 4 and 6 in that the same construction of perforated inlet casing 90, check valve 104 and conduit 92 are provided in conjunction with the sumps 20. However, in this embodiment, a combined discharge and return pipe 116 extends through the uppermost point of the partition 14 into free communication with the interior of the storage chamber 16, and this conduit 116 is connected to the two return lines 92 as by T-couplings 118 and nipples 120. A further T-coupling 122 is provided to connect the two nipples 120 with the inlet and outlet conduit 116. From the T-couplings 118 extend connecting pipes or nipples 124, which are provided with check valve casings 126, each of which is connected to one end of a discharge conduit 128 which may conveniently comprise a plurality of parallel return pipes forming a net-work of pipes secured in any desired manner to the under surface of the partition 14 and in intimate or in direct heat conducting relation thereto, the ends of these conduits 128 extending through the partition 14 as at 130 in a position closely adjacent the marginal trough or channel defined by the adjoining surfaces of the partition 14 and the casing 10.

The operation of this construction is as follows. Upon expansion or increase in pressure of the fluid in the storage compartment 16, a portion of the fluid is forced upwardly through the pipe 116, through the T-coupling 122, into the nipples 120, and from there into both the nipples 124 and the fluid return line 92. That portion entering the fluid return line 92, is prevented however from escaping by means of the check valve constructions in the valve casings 104, while the fluid from the nipples 124 is discharged through the expansion, non-return valves 126 into the expansion and refrigerating coil 128, to eventually emerge from the ends 130 thereof upon the upper surface of the partition 14 in the vapor compartment 18.

As will be readily understood, the discharge nozzles 130 may be provided with baffles or deflectors in order to control the direction of the discharged liquid or vapor and spray the same in directions as desired, or if preferred the emerging fluid may be permitted to flow over the top of the partition 14 to collect in the above-mentioned condensate and liquid collecting channels and thence find its way to the sumps 20 for return through the return line as above mentioned.

When now after discharge of a portion of the volatile liquid within the storage chamber 16, the pressure within said chamber drops below the differential pressure maintained by the pressure reduction valves 126, the relative difference of pressure in the vapor and storage chambers results in a relatively reduced pressure in the conduit system 116, 120, 92, from the pressure existing in the vapor chamber 18, whereby the liquid accumulations in the sumps 20 are forced past the check valve assemblies 104 and by means of the return conduits 92, T-couplings 118, nipples 120, and T-coupling 122, are drawn back into the storage chamber 16. During this return flow, the reduced pressure existing in the nipples 124 maintains the pressure reduction valves 126 in their closed positions, to thereby prevent the drawing in of vapor directly from the chamber 18 through the ends 130 of the refrigerating coils 128.

It will thus be seen that in this particular embodiment, a single inlet and outlet conduit is provided for the flow of fluid into and from the storage chamber 16 and the vapor compartment 18, and by the two sets of valves 126 and 104, the direction of this flow is controlled in response to the pressure differences.

Referring now to Figure 11 which shows a further modified application of the principles of the invention, it will be seen that the partition 14 dividing the container or tank 10 into the storage chamber 16 and the vapor chamber 18, is provided at its junction with the tank 10 with deepened troughs or channels as shown at 132, to provide enlarged and accentuated condensate and liquid collection gutters or troughs in the vapor chamber 18, from which may extend the customary above referred to sumps 20. As shown in this embodiment, it may be preferred to form the fluid outlet conduit for the fluid circulating and refrigerating system with a depending or extended pipe 134 which extends down into the chamber 16 adjacent the bottom thereof or at least definitely into the cooler portions of the liquid contained therein, whereby the liquid forced out of the storage chamber 16 by means of the differential pressure existing between the two chambers, will be withdrawn from the cooler portions of this storage chamber. Obviously, in a construction of this type the cooler portions are found nearer the bottom of the tank, since the upper portions are more directly exposed to the rays of the sun or other external source of heat, while the lower portions are sheltered by the upper structure of the tank, and liquid therein, as well as being cooled by its complete immersion in the water.

This discharge conduit 134 extending through the partition 14 is provided with the customary above mentioned pressure reduction valve assembly 86, from whence the discharge fluid passes through the circulating conduit or coil system indicated by the numeral 138, and which is disposed in intimate heat exchange relation with the upper surface of the partition 14 over predetermined areas thereof, and which may be provided with the spray nozzles and deflectors such as those mentioned in connection with Figures 1, 2, 4 and 6. The return of the fluid or condensate collecting in the troughs 132 and sumps 20 may be returned by the conduits 92 of the same construction as those described in connection with the embodiment of Figures 1, 2, 4 and 6, or if preferred by the conduit piping and arrangement of Figure 8 previously described.

It is to be clearly understood that the termination of the discharge conduit of any of the embodiments of this invention may be extended into the cooler portions of the compartment 18, in the manner indicated in Figure 11, if desired. Further, a single return discharge conduit may be provided or if desired a plurality of discharge conduits connected to separate circulating and refrigerating piping systems may be provided as preferred.

Although in the preceding embodiments of the inventive concept I have disclosed an upwardly curving or dished partition 14, it is to be understood that the invention is not limited thereto but may likewise include downwardly dished or extending partitions as shown in Figure 10. Here, the partition 14 is suitably secured to the walls of the tank 10, and is dished downwardly along its longitudinal medial axis, wherein the storage chamber 16 is crescent-shape, while the vapor chamber 18 is bounded by concave walls. Obviously, in this construction, the lowermost point will be the longitudinal center line of the partition 14, and consequently the condensate and liquid accumulating in the vapor chamber will collect along the longitudinal center thereof. At one or more points along its length, as desired, downwardly extending conduits 140 are terminally connected to freely communicate with the vapor chamber 18 at its lowermost portion, and with a sump or sumps 142 which are preferably positioned within the tank 10 and at the lowermost portion thereof.

This sump compartment or compartments may be defined by longitudinally extending arcuate housings 144, which may be welded or otherwise secured to the bottom inner wall of the tank 10 and to the outer circumference of the conduits 140. Obviously, a single such sump may be provided extending throughout all or any desired portion of the length of the tank 10, or if desired a plurality of such sumps or compartments may be formed, each communicating with the chamber 18. Thus, any condensate or liquid received in the vapor chamber 18 will be drained by gravity through the conduit or conduits 140 into the sump compartment 142 which is thus positioned at the coolest region of the tank. From the sump 142, extend a plurality of return conduits 146, the upper ends of these conduits being suitably braced or attached as at 148 to the under surface of the partition 14, in a position to discharge into the hottest zones of the storage chamber 16, such as the regions bounded by the arcuate walls of the partition 14 and the 10. The return conduits 146 are provided non-return check valves assemblies 150 which may be of any suitable type such, for example, as that indicated in the valve casing 104 of Figure 14, to readily permit flow of fluid upwardly from the sump 142 into the storage compartment 16 but to prevent return flow. Spray nozzle assemblies 152, provided with deflectors 154 and with pressure reduction valve assemblies 156, establish communication with vapor chamber 18 and the storage chamber 16 at the highest point of the latter. Obviously, the spray nozzles, pressure reduction valves and necessary conduits may be of any of the hereinbefore described constructions, and these discharge conduit systems may communicate with the uppermost portion of the storage chamber 16 or if desired may have their inlet ends extending down into the liquid adjacent the lower portion of the storage chamber. Obviously, the principles of this embodiment may be incorporated in any of the previously described constructions and arrangements.

The operation of this form of the invention is as follows. Upon an increase in temperature and hence of pressure of the fluid within the storage chamber 16, which as in all the embodiments of the invention is to be understood as being at all times completely filled with the volatile liquid, the fluid therein expands and is discharged to the pressure reduction valve 156 and spray nozzles 154 into the interior of the vapor chamber 18, the pressure reduction of the discharging fluid serving to chill or refrigerate the partition 14 and hence of the volatile liquid in the chamber 16 therebeneath. This chilling or refrigerating action as well as the withdrawal of a portion of the liquid contents of the chamber 16, serves to lower the pressure thereof and as a concomitant thereof to lower the temperature to which the fluid therein is subjected. The liquid or vapor sprayed into the vapor chamber 18 is collected and returned by the conduits 140 to the sump 142, where the same is further cooled by its position in the coolest region of the tank. When the pressure has dropped sufficiently in the storage chamber 16, this relative reduction of pressure compared to the increased pressure existing in the vapor chamber 18 and the sump 142 which is in free pressure communication therewith, serves to force the cooled fluid by means of return conduits 146 into the hottest portions of the storage chamber 16, serving thereby to further cool the same.

Thus, as in the other embodiments, this arrangement serves to produce an intermittent circulation of the fluid received in the tank 10 from its coolest to its hottest portions in order to alleviate the rising temperatures to which the upper portions of the tank are subjected, and to thereby lower the peak temperature and pressures to which the storage and transportation tank 10 is subjected.

As will be clearly apparent by reference to Figures 7 and 10, the conduit 140, if but one such conduit is provided, will be preferably located at about the center of the tank 10, and will be provided with branch conduits 153 which communicate with the central, longitudinally extending trough upon the upper surface of the partition 14 adjacent the ends thereof and drain liquid accumulating therein by means of orifices 155 in the lower ends of the conduit 140, so that any liquid accumulating in the vapor chamber 18 may be constantly returned to the sump 142.

As shown in the detail view of Figure 12, the discharge conduit spray system of Figure 10 may conveniently include longitudinally extending headers 157 along which are connected the above-mentioned reduction valves 156 with spray nozzles and spray baffles 154, the headers 157 being preferably located parallel to and closely adjacent the junction of the partition 14 with the tank 10.

As hereinbefore set forth, the various fluid discharge and return systems are operable automatically by and in response to pressure changes in the pressure differential between the storage chamber 16 and the vapor chamber 18, and hence, in view of the relatively large quantities of liquid involved operate at relatively long intervals. For example, the previously described systems in a tank of about 90 feet in length and about 9 feet in diameter will when operated in hot water and exposed at the direct rays of the sun, have an automatic actuation of six to twelve times during the day. Clearly with such an arrangement, the extent of the commingling of the refrigerated or cooled portions of the liquid with the rest of the liquid in the tank occurs at relatively long intervals and is not relatively thorough.

Where a system which is more sensitive to temperature and pressure variations is desired, what may be termed a secondary or booster system is incorporated, as set forth in Figures 13, 15, 16, 17 and 9. In this arrangement, the tank 10, divided by the partition 14 into the volatile liquid storage chamber 16 and the vapor chamber 18, is provided with concentric fluid discharge and return conduits. In the embodiment chosen to illustrate the principles of this type of construction, the discharge or refrigerating conduit system has been shown as the exterior conduit, while the return conduit system has been shown as the interior conduit of the concentric arrangement. However, it will be understood that the principles permit of the reversing of this arrangement, wherever the same is found to be expedient or preferable. As will be seen by reference to Figures 9 and 13, the central top portion of the upwardly curving partition 14 is provided at its highest location with one or more pipes 161 freely communicating with the interior of the storage compartment 16 to provide an outer, return line therefor, while disposed centrally of the return pipe 161 is an outlet pipe 163 whose lower end may conveniently extend into the cooler portions of the compartment 16 and if desired into close juxtaposition to the bottom wall thereof as shown in Figure 13. At this upper end, the discharge conduit 163 communicates with a fitting 162 from which extend nipples 164 forming part of a piping connection with expansion valve assemblies 166 which, in turn, are connected with the upwardly extending terminal portions of the refrigerating coils 168 which extend through the partition 14 into the tower 34 where the above-mentioned pressure reduction valves and fittings are located. This refrigerating and expansion coil 168 is then disposed with return bends upon the under surface of the partition 14 in intimate heat exchange relation therewith as will be clearly apparent from Figures 9, 13 and 15.

As shown best in Figure 9 the outermost and return conduit 161 has lateral extensions 170 to which are connected the terminals of the return conduits 172, the conduits 172 being received within the discharge refrigerating conduits 168. Suitable non-return spring closed check valves are provided in couplings or casings 174, at any desired type of pressure operated non-return valve may be employed therein, such for example as the ball valve 176 which is urged to its seat as by a spring 178. The other end of the refrigerating conduit 168 extends through the partition 14 as shown in Figure 13, and discharges to the outer surface thereof into the vapor compartment 18, while the corresponding end of the inner conduit 172 constituting a return conduit, is connected as shown in Figure 13 with the check valve housings 104 and liquid inlet members 90 disposed in the sumps 20, which construction may be substantially identical with that previously described with regard to these elements. It should thus be particularly noted that there are two check valves, the assembly 104 and the assembly 174 for the two terminals of the return lines, for a purpose to be later set forth. The discharge and expansion conduit system 168 may be provided with suitable spray nozzles or the like for diffusing the fluid emitted thereby into various portions of the vapor chamber 18 in accordance with the previous manners set forth hereinbefore.

As shown more clearly in Figure 15, the upper end of the return conduit 161 is provided with a head or housing portion 180 having the above mentioned lateral extensions 170, this portion 180 being provided with a manually operable pressure release or venting valve, indicated generally by the numeral 182, which is operable to vent the interior of the storage compartment 16 to the vapor chamber 18 when it is desired to fill or empty the storage compartment, and thus avoid filling or emptying the same against a varying pressure therein. This valve construction includes a tubular conduit 184 having its lower end communicating with the interior of the head portion 180, and having a discharge opening 186 which is in communication with the interior of the vapor compartment 18. The inlet end of the conduit 184 is controlled by a downwardly opening valve 188 which may be of the poppet type if desired, and which is provided with a valve control stem 192 rigidly attached thereto, said stem having a plunger 194 guidingly and slidingly received in the tubular conduit 184, a valve closing spring 196 being engaged between the lower end of the plunger 194 and a suitable spring seat whereby the valve is urged by the spring to its closed position.

The upper end of the valve stem 192 is pivotally connected as at 198, to an operating lever 200, suitably journaled upon a support, the outer end of this operating lever being pivoted as at 202 to the end of an operating handle or lever 204.

The arrangement is such that when the lever 204 is rotated in a counter-clockwise direction as viewed in Figure 9, the lever 200 is oscillated in a clockwise direction to thereby force the valve 188 from its seat and thereby vent the interior of the compartment 16 to the interior of the vapor compartment 18. It will be noted that the extremity of the lever 204 is provided with a cam or eccentric member 206 which is adapted to abut against a surface carried by a bracket 208, whereby the valve may be locked in its open position by throwing the lever 204 in a counter-clockwise direction.

Referring again to Figure 15 particularly, it will be seen that the upper end of the discharge conduit 163 is connected as by a laterally extending pipe 210 to the above mentioned valve fitting 162, whose construction is shown best in Figures 16 and 17.

The valve fitting 162 is provided with a tapered valve seat 212 upon which is removably seated a valve member 214 having a valve stem 216. This valve is guided for sliding movement in the valve chamber by means of longitudinally extending guide ribs 218, see Figure 17, which define a plurality of parallel liquid flow channels 220 therebetween, by means of which fluid may be discharged from the conduit 210 past the valve and guide ribs 218 into the valve fitting 162 and from thence by means of the pressure reduction valves 166 into the refrigerating conduit system 168. The valve 214 is resiliently urged against the seat by means of a coil spring 222 which surrounds the valve stem 216 and abuts against the guide ribs 218 at one extremity and a retaining collar 224 suitably received in a recess 226 in a sleeve 228 which is screw-threadedly engaged in a bore 230 in the outer end of the valve casing 162. This sleeve is provided with an operating handle 232 by means of which the sleeve 228 may be moved inwardly and outwardly of the fitting 162.

The arrangement is such that by moving the sleeve 228 inwardly of the screw-threaded bore 230, the valve seating spring 224 rigidly carried thereby will compress the valve spring 222 and thus vary the valve closing pressure of the device. Alternatively, by retracting the sleeve 228, the valve closing pressure may be reduced, and if the sleeve is moved far enough the spring seating member 224 will positively engage the end of the valve stem 216 and forcibly retract the valve from its seat.

The operation of this embodiment of the circulating and refrigerating system will now be described. With particular reference to the diagrammatic views of Figures 20–23, the operation is as follows. When the compartment 16 is initially filled with volatile liquid, a certain quantity of liquid is permitted to overflow the filling port, to thereby provide an accumulation of liquid in the sump 20, such as to the level indicated by the dotted line 234. This liquid serves to prime and submerge the inlet members 90 of the return line 92, and insure that there will be sufficient liquid present in the combined vapor and storage compartments of the tank 10 to at all times fill the conduit systems during operation while maintaining the compartment 16 entirely filled with liquid. It is desired to here emphasize that throughout the entire operation of this apparatus and method, that the pressure within the storage compartment 16 will always be above atmospheric pressure, being at about the range of 40 pounds pressure for butane, and about 100 pounds pressure for propane and ammonia. This may be regarded as the normal minimum pressure when the apparatus is quiescent.

The diagrammatic view of Figure 20 discloses the conditions prevailing in the apparatus when the pressure within the storage chamber 16 has risen relative to the pressure of the vapor chamber 18, because of the inflow of heat into the tank.

This rise in temperature effecting a rise in pressure in the storage compartment 16, has, as shown in Figure 20, started a flow of liquid from the cooler portions of the tank upwardly through the discharge conduit 163 in the direction indicated by the arrows, has unseated the expansion valves 166 against the opposition of their closing springs and has started a flow of the pressurized discharge liquid through the refrigerating and pressure reducing discharge conduits 168 as shown by the arrows therein, this flow into the sealed vapor compartment 18 tending to raise the pressure therein. This rise in pressure in the vapor compartment, applied to the level 234 of the liquid already contained therein, increases the pressure to which such liquid is subjected and causes a flow into the inlet member 90 as indicated by the arrows, and some of this liquid will pass the spring opened check valve 106 to enter the return conduit 92 and fill the same as indicated by the arrows therein. However, the check valves 176 adjacent the discharge end of the return conduit and which are normally closed by their closure springs 178, are further positively closed since they are subjected to the increased pressure within the storage chamber 16 by means of the free communication of the latter through the return conduit or pipe 161.

It will thus be seen that during the initial stage of the operation, the rise in pressure in the storage tank has produced an outward flow of the cooler portion of the liquid therein, and has at the same time positively closed the check return valves 176 at the upper or discharge ends of the return conduits, and has further forced liquid into the return conduits or increased the pressure therein. After passing the pressure reduction valves 166, the fluid in the conduits 168 is chilled thereby and absorbs heat from the return conduit 172, thereby refrigerating the latter as well as the walls of the conduit 168 and all parts with which the latter is in heat exchange relation. This chilling of the conduit 172, and its contents, lowers the pressure therein thereby assisting the augmented pressure imposed on the liquid level 234 in filling conduit 172. This action tends to prolong the flow and circulatory movement of fluids. This action has further resulted in lowering the pressure within the storage compartment 16 by reason of the withdrawal of a portion of the contents thereof, and further because of the refrigerating action of the expanding liquid in the discharge conduits 168, has lowered the temperature of the storage tank and hence further reduced the pressure to which the confined liquid therein is subjected.

When now a new ratio of pressure has been established between the storage and vapor compartments, by reason of the reduction of pressure in the storage tank from its maximum increased pressure, and by the above mentioned cooling effects, the condition depicted in Figure 21 will prevail. Since the pressures between the tanks 16 and 18 have reached equilibrium, there will be a temporary cessation of flow through the discharge conduit 163, as shown by the double headed arrow therein, and consequently the reducing valves 166 will be closed against their seats by their springs, and there will be no flow through the refrigerating conduit 168, as indicated by the absence of flow arrows therein. However, the reduction of the pressure within the storage compartment 16 by reason of the cooling and partial withdrawal of the liquid therein now leaves the vapor compartment and the conduit 172 at a relatively higher pressure, which pressure forces open the spring closed valves 106, and induces a flow of liquid from the sump 20, as indicated by the arrows, through the return conduit 172, and this pressure difference forces open the check valves 176 and forces liquid from the sump 20 through the return conduit 161 and back into the interior of the storage compartment 16 as indicated by the arrows in Figure 21, this action continuing until the pressures of the chambers 16 and 18 are again in equilibrium.

It should be here noted that during the latter part of this return flow, the pressure in chamber 18 may drop below that in the conduit 172 whereupon the valves 106 will close. As the elevated pressure in conduit 172 acts against the closed valves 106, a flow is induced past valve 176 into chamber 16. This causes a pressure rise which in turn may (depending upon the pressures involved, and the closing bias of valve 166) cause a flow from 16 through the discharge conduit 163 and passages 168 and passages 168 into vapor compartment 18.

The above described operation represents the refrigerating circulating primary cycle of the device, and as hereinbefore mentioned this cycle of operation is effected at relatively long intervals of time by the creation of a sufficient pressure differential between the relatively large volumes contained in the storage and vapor chambers.

However, a portion of this apparatus is capable of much more frequent and sensitive operation, and its functioning constitutes what may be termed the sensitive or secondary refrigerating and circulating system. When the above described pressure equilibrium has been reached after the operation described in connection with Figure 21 has been effected, the condition shown in Figure 22 will exist wherein there is no flow of fluid between the chambers. However, since it is assumed that the tank is constantly subjected to an inflow of heat from an external source, such as the sun's rays or the like, it will be appreciated that the vapor compartment and hence the conduit system associated therewith and which overlies the storage compartment will be heated faster than the bulk of the liquid in the storage compartment. Consequently, the relatively small quantity of fluid which is trapped and retained in the return conduit 172 between the inlet and discharge check valves 106 and 176 thereof, will be subjected to a relatively rapid rise in temperature and a resultant relatively rapid increase in pressure over the change of temperature and pressure of the body of liquid in the storage chamber. This rise in pressure within the return conduit thus closes the check valve 106 and forces open the check valve 176, thereby inducing a flow of fluid through the return conduit 161 into the tank storage compartment 16 as indicated by the arrows in Figure 22.

It will be noted that this return flow just mentioned may be assisted by and in fact may even be occasioned by the increased pressure generated in the vapor compartment 18 by the relatively rapid heating thereof.

When the initial stage of the operation indicated in Figure 22 has been completed, it will be seen that the liquid return to the storage chamber 16 will produce a pressure rise therein, whereby the pressure within the chamber 16 will then be somewhat above that prevailing in the chamber 18. Accordingly, as indicated in Figure 23, the increased pressure in the chamber 16 will induce a flow as shown by the arrows, through the discharge conduit 163, and thence through the pressure reduction valve 166, into and through the refrigerating conduit 168.

It will be readily apparent that there is produced a step by step movement of liquid from the cooler portions of the storage chamber, through the discharge conduit and refrigerating coils connected thereto, to the relatively more highly heated vapor chamber; thus producing a cooling effect therein as well as on the vapor portion of the storage chamber, this being followed by a return of the cooled or chilled discharged fluid through the return conduits into the hotter portions of the storage chamber, thus effecting a mixing action of the hotter and cooler portions of the liquid within the storage chamber as well as utilizing the thermo-dynamic forces of the external source of heat to cause this operation and minimize the temperature and pressure extremes heretofore encountered in storing volatile liquids and fluids in sealed containers.

It is to be particularly noted that it is an inherent function of this heat exchange arrangement of the discharge and return conduits to effect a prolongation of the discharge flow through the discharge conduit 163, since when the systems are full of fluid and in the condition indicated in Figure 20, the outward flow through the discharge conduit 163 into the lower pressure of the vapor chamber will be accompanied by a gradual reduction of the pressure within the chamber 16, until just prior to the condition indicated in Figure 21, there will be a simultaneous outflow through the conduit 163 accompanied by a smaller inflow through the conduit 161, this inflow being occasioned by the reduction of pressure against the check valve 176, while the check valve 106 remains closed.

Obviously, in the sensitizing or secondary circulatory system, the conduits 172 with their inlet and outlet check valves 106 and 176, actually function as fluid pumps for repeatedly and intermittently delivering liquid from the sumps 20 into the tank 16, such inlet of liquid occasioning a corresponding outflow from the discharge conduit 163. It will be evident that the motivating and controlling factor for this cyclic operation is a constantly varying relative pressures existing in the compartment 16, the compartment 18, and the chambers which are defined by the return conduits 172.

It will be seen that during operation of the system cooling action occurs in at least five distinct phases or actions, as follows:

(1) By means of a direct flow of heat between the heat conducting walls between the two fluids at different temperatures, as by the flow of heat between chambers 16 and 18 through the partition 14 and/or the walls of the tank 10, a similar flow between the refrigerating coils and the return conduits, as well as between either chamber and/or the conduit system and the surrounding water medium.

(2) By means of the pressure reduction in the confined body when fluid is withdrawn or expelled therefrom, this cooling action being effected during, and supplementing that of the preceding paragraph.

(3) By means of the expansion of the withdrawn fluid, into a lower pressure zone whereby it is chilled and absorbs heat from its surroundings as during the fluid flow through the pipe systems 168 and 172.

(4) By means of the expulsion of vapor accompanied possibly by some fluid not entirely vaporized from the end of the concentric tube 168 into the vapor chamber 18, this vaporization producing a further heat absorption and cooling action.

(5) By means of the pressure reduction in the vapor chamber 18 when there is a withdrawal of fluid therefrom by the tubing 172.

I desire it to be distinctly understood that although the secondary system has been described and may very efficiently consist of concentric discharge and return conduits, yet various other relative arrangements of these conduits and disposed at different positions in the storage and vapor chambers could be employed as necessity dictates. Moreover, if desired, these conduits could be provided and arranged in substantially non-heat exchange relation with respect to each other, the effect of this being that the discharge and return flows of the cycle of operation would be of greater duration and would occur at less frequent intervals than when the pipes are disposed in the above-mentioned intimate heat exchange relation with respect to each other.

As a further refinement and safety feature in incorporating this invention into barges or the like, the construction disclosed in Figure 13 may be employed. Here, it will be seen that the blisters 24 may be provided with a plurality of conduits or containers 236, interconnected by cross communications 238, which conduit system is welded or otherwise secured to and supported by the inner surface of the side wall of the blisters 24, in a position whereby the conduits will be ruptured when the blisters 24 are damaged as by a collision or the like. These conduits may extend entirely about the tank 10, or over predetermined portions thereof as found to be most convenient, and it is contemplated that the same shall contain a firefighting medium such as carbon dioxide or the like, so that upon rupture of the conduits 236 by damage to the blisters of the tank, the carbon dioxide will be released at the place of collision and rupture, to thereby chill the tank and lessen danger of its highly explosive and volatile contents from igniting. Obviously, any suitable means may be provided for insuring a supply of carbon dioxide under pressure, such for example, as pre-charging the conduit system with the carbon dioxide and sealing the same; maintaining carbon dioxide under a source of pressure in communication with the interior of the conduit 236; or even circulating by means of a pump or the like carbon dioxide throughout the conduit system.

It is further contemplated that the rub rails 28 may not only extend upon the sides of the blisters, but may also be provided underneath the tank 10 to function as keels or the like, and reinforce the tank at this part.

As set forth hereinbefore, detail emphasis has been placed upon the manner of utilizing the method and apparatus in accordance with the principles of this invention for the transportation of confined bodies of volatile liquids, and chiefly in barges or the like. However, it will be readily appreciated that various features of the invention are equally applicable to stationary or other installations for storing such liquids where it is desired to maintain relatively uniform pressures and temperatures therein, and for this purpose containers of any desired shape may be provided having therein the completely sealed vapor storage and liquid storage compartments in accordance with the principles hereinbefore set forth. Since the fundamental concept of this invention requires the utilization of varying or variable differential pressures in the vapor and liquid storage compartments to effect the refrigerating or cooling action and the circulation of fluid between these compartments, it will be evident that the same principles of operation may be applied advantageously and substantially in the manner hereinbefore set forth to non-portable containers.

The possibility of employing in such stationary installations and even in some portable containers an assisting or substitute propulsive force for the circulating system, such as a mechanically operated pump is to be regarded as falling within the concept of the invention. It may be frequently found desirable to interpose in either the discharge or the return conduit system or in both, a pressure producing means for obtaining the desired differential pressure between the various elements of the circulating system, or for augmenting pressure differentials which are created and obtained in the manner set forth hereinbefore. Further, it will be evident that pressure producing means such as pumps or the like may be directly applied to either of the compartments 16 or 18 as an auxiliary or a substitute for the thermo-dynamic pressure pumping action above-mentioned.

Furthermore, the refrigerating or cooling action which is a concomitant of the fluid circulation, may be enhanced and augmented by auxiliary refrigerating and cooling systems, particularly when it is desired to remove a barge-like container from the water for transportation or storage on land, at which time the cooling effects realized from the immersion of the container in water are lost.

It is to be further understood that although the illustrations have depicted the partition 14 as either concaved or convexed with respect to the walls of the tank 10, the invention may be realized by partitions of various other configurations. For example, a partition having planar, sloping sides may be employed and the discharged liquid may be caused to flow down the sloping sides to a collection trough or troughs, both to provide the cooling action desired as well as to collect and accumulate the discharged liquids in sumps. The rate of flow over the sloping surfaces whether planar or curved, may be utilized more efficiently by providing baffles or channels thereon to cause the descending liquid to follow more-or-less tortuous paths and hence prolong its heat exchange relation with the surface of the partition.

It will, of course, be evident that the various valves will be calibrated or adjusted to allow for the various hydrostatic heads to which they may be exposed.

It should not be overlooked that certain features of the invention which have been heretofore treated as subordinate may in themselves be capable of realization and utilization as separate and primary objects. Thus, I may avail myself of the varying pressure differentials customarily encountered in storing volatile liquids in closed containers, having liquid and vapor compartments, for producing thermo-dynamic forces capable of employment as, for example, for operating various refrigerating, air-conditioning mechanisms or the like.

It should be especially noted that the method and apparatus set forth hereinbefore all possess the advantage that they are capable of use in storage systems wherein the vapors generated by and accompanying the storage of volatile liquids are in themselves possessed of sufficient value to warrant provision for their retention and salvaging. The practicing of this invention in such environments thus does not necessitate the creation of additional storage compartments for either liquid or vapor, but merely advantageously utilizes such existing features of construction.

It will be noted that in all of the embodiments chosen for purpose of illustrating the principles of the invention, the vapor and storage compartments have been shown disposed in juxtaposition and positioned within a single exterior casing. While this construction possesses the advantages of compactness and is extremely desirable in portable containers, it should be recognized that the basic principles of the invention are to be in no way restricted thereto. Thus, it is quite within the concept of the invention to utilize liquid storage and vapor compartments which are separated from each other, since the discharge and return conduit systems are obviously capable of accommodating such arrangements.

Moreover, not only may the separation of the vapor and storage compartments be employed in stationary storage installations, but in some instances they may be advantageously employed in portable tanks for use or water ways or over land. For example, existing liquid containers for handling non-volatile liquids may readily be adapted to the storing of volatile liquids by providing a sealed vapor compartment which may be attached to the outer surface of the container as a blister-like construction, may be mechanically secured to the container; or even may be provided within the container as preferred, it being understood that the circulating system may be easily connected to the vapor and liquid compartments in these various positions of assembly.

From the foregoing, it is thought that the mode of employing the method and apparatus hereinbefore set forth, together with their numerous advantages will be readily perceived and further explanation is believed to be unnecessary. However, since numerous modifications and changes falling within the purview of the invention will be readily understood by those skilled in the art after a consideration of the foregoing specification and accompanying drawings, it is not desired to limit the invention to the exact method and constructions shown or described in the foregoing specification and annexed drawings, except as required by the appended claims.

Having described the invention what is claimed as new is:

1. A method for reducing the pressure produced upon a confined body of fluid when subjected to external heating effects comprising educting a portion of the fluid to decrease the pressure to which the confined body is subjected, applying a cooling medium in heat exchange relation to a portion of the confined body of fluid, and subsequently returning said educted portion to said confined body upon a decrease in the pressure thereof, the educted portion being withdrawn from a relatively cooler region of said confined body.

2. The method of claim 1 wherein said educted portion is returned to a relatively hotter region of said confined body.

3. The method of reducing the pressure generated in a confined body of fluid subjected to external heating effects comprising educting a portion of the fluid to diminish the pressure on the confined body, effecting the circulation of a cooling medium in heat exchange relation to a portion of the confined body and subsequently returning said educted portion to said confined body upon a decrease in the pressure thereof, the educated portion being withdrawn from a relatively cooler region of said confined body.

4. The method of claim 3 wherein said educted portion is returned to a relatively hotter region of said confined body.

5. An apparatus for storing fluids comprising sealed storage and vapor compartments, discharge means responsive to a predetermined pressure for discharging fluid from said storage to said vapor compartment, means for cooling the discharged fluid, conduits for placing the cooled fluid in heat exchange relation with said storage compartment and return means for returning fluid from said vapor to said storage compartment when the pressure in the former exceeds that of the latter, said vapor and storage compartments being formed by a partition in a container, said conduits directly engaging said partition.

6. An apparatus for storing fluids comprising sealed storage and vapor compartments, discharge means responsive to a predetermined pressure for discharging fluid from said storage to said vapor compartment, means for cooling the discharged fluid, conduits for placing the cooled fluid in heat exchange relation with said storage compartment and return means for returning fluid from said vapor to said storage compartment when the pressure in the former exceeds that of the latter, said vapor compartment having a liquid collecting sump, the adit of said return means being disposed in said sump, said return means having inlet and outlet valves for causing unidirectional flow therein, said return means being disposed in more direct relation to external heat sources than said storage compartment, said container having curved walls and a blister provided upon the exterior of said curved walls.

7. An apparatus for storing volatile liquids under pressure comprising, a vapor compartment, a storage compartment, means responsive to a relative rise in pressure of the storage compartment for discharging liquid therefrom into said vapor compartment, and return means for returning liquid from said vapor to said storage compartment, and additional means in said return means for causing a flow of liquid through said discharge means.

8. In an apparatus for storing volatile liquids under pressure and having vapor and liquid storage compartments, a cooling system comprising non-return conduits connecting said compartments and means responsive to predetermined pressure differences between said compartments for causing a step by step circulation of liquid therebetween.

9. A method for reducing the pressure produced upon a confined body of fluid by the inflow of heat in a system of the type having adjacent closed liquid and vapor chambers separated by a partition comprising educting from the liquid chamber, while maintaining the liquid chamber filled with liquid, a portion of the fluid in its liquid phase to thereby decrease the pressure to which the remainder of the fluid in the liquid chamber is subjected, delivering the educted portion into the vapor chamber, cooling the confined body of fluid by applying a cooling medium in direct heat exchange relation to the partition to thereby cool said confined body.

10. The method of claim 9, wherein the cooling medium is intermittently applied.

11. The method of claim 9, wherein the steps of educting and of applying a cooling medium are effected intermittently.

12. A method for reducing the pressure produced upon a confined body of fluid by the inflow of heat in a system of the type having adjacent closed liquid and vapor chambers separated by a partition, comprising educting from the liquid chamber, while maintaining the liquid chamber filled with liquid, a portion of the fluid in its liquid phase to thereby decrease the pressure to which the remainder of the fluid in the liquid chamber is subjected, vaporizing the educted portion by reducing the pressure thereof, applying the vaporized educted portion in direct heat exchange relation to the partition as a cooling medium for chilling the same while delivering the educted portion into the vapor chamber.

13. The method of claim 12, wherein the steps of educting and of applying a cooling medium are effected intermittently.

14. A method for reducing the pressure produced upon a confined body of fluid by the inflow of heat in a system of the type having adjacent closed liquid and vapor chambers separated by a partition, comprising educting from the liquid chamber, while maintaining the liquid chamber filled with liquid, a portion of the fluid in its liquid phase to thereby decrease the pressure to which the remainder of the fluid in the liquid chamber is subjected, vaporizing the educted portion by reducing the pressure thereof, applying by spraying the vaporized educted portion in direct heat exchange relation to the partition as a cooling medium for chilling the same while delivering the educted portion into the vapor chamber.

15. The method of claim 9 including the step of thereafter returning the educted portion into the liquid chamber upon a decrease in the pressure of the liquid confined therein.

16. The method of claim 12, including the step of thereafter returning the educted portion into the liquid chamber upon a decrease in the pressure of the liquid confined therein.

17. A method of reducing temperatures and pressures in a closed system having a confined liquid chamber and a confined vapor chamber comprising, subjecting the liquid chamber to a relatively constant external temperature while subjecting the vapor chamber to temperatures alternately greater and less than that of the liquid chamber, effecting flow of fluid between the chambers when the pressure in one exceeds the pressure in the other by a predetermined amount employing fluid flowing between the chamber to extract heat from the fluid in the liquid chamber.

18. The method of claim 17 wherein the flow of fluid between the chamber is effected by thermo-dynamic action of the fluid confined in one chamber.

19. The method of claim 17, wherein the flow of fluid is unidirectional.

20. An apparatus for storing fluids comprising sealed storage and vapor compartments, discharge means responsive to a predetermined pressure for discharging fluid from said storage to said vapor compartment, means for cooling the discharged fluid, conduits for placing the cooled fluid in heat exchange relation with said storage compartment and return means for returning fluid from said vapor to said storage compartment when the pressure in the former exceeds that of the latter.

21. The combination of claim 20 wherein said means for cooling includes pressure reducing means for lowering the pressure of the discharged fluid.

22. The combination of claim 20 wherein said vapor compartment has a liquid collecting sump, the adit of said return means being disposed in said sump.

23. The combination of claim 22 wherein said return means has inlet and outlet valves for causing uni-directional flow therein.

24. The combination of claim 23 wherein said return means is disposed in more direct relation to external heat sources than in said storage compartment.

25. The combination of claim 24 wherein said vapor and storage compartments have curved walls, a blister provided upon the exterior of said curved walls, and having an edge joining said curved walls, said edge overlying said sump.

26. The combination of claim 20 wherein said vapor compartment has a liquid collecting sump, the adit of said return means being disposed in said sump, heat shielding means for maintaining a lower temperature in said sump than in the rest of said vapor compartment.

27. The combination of claim 20 wherein said vapor compartment has a liquid collecting sump, the adit of said return means being disposed in said sump, means for cooling said sump to maintain a reduced temperature therein relative to that of the vapor compartment.

28. The combination of claim 6 including cooling means in said blister.

29. The combination of claim 20 wherein said vapor and storage compartments are formed by a partition in a container, said conduits directly engaging said partition and being disposed in said vapor compartment.

30. The combination of claim 29 wherein said vapor compartment has a sump, the inlet of said return means communicating with said sump.

31. An apparatus for storing volatile liquids under pressure comprising a container, a partition dividing said container into an upper vapor compartment having a sump and a lower liquid storage compartment, a valved discharge conduit for discharging liquid under pressure from said storage into said vapor compartment, means for cooling the discharged liquid, a valved return conduit extending into said sump for returning liquid to said storage compartment, the valves of said conduits being so regulated as to cause intermittent flow between said compartments in response to pressure differences therebetween.

32. The combination of claim 31 wherein said discharge conduit withdraws liquid from the cooler portion and the return conduit delivers liquid to the hotter portion of said storage compartment.

33. The combination of claim 31 wherein said return conduit includes a pumping chamber, inlet and outlet valves for said chamber, said chamber being positioned in a more accessible position for receiving heat than said storage compartment.

34. The combination of claim 31 wherein said discharge conduit includes means for directly venting said storage compartment to said vapor compartment, said means for cooling the discharged liquid including a pressure reducing means in said discharge conduit.

35. That method for reducing the pressures thermo-dynamically generated by external heating in confined bodies of volatile liquids having storage and vapor chambers connected by discharge and return conduits, which includes sequentially transferring liquid between the storage and vapor chambers in response to predetermined pressure differences therebetween while maintaining the storage chamber continuously filled with liquid, lowering the pressure of the withdrawn liquid during transit to decrease its temperature and cooling the confined body by direct heat exchange with the fluid in the vapor chamber and with an external coolant, by lowering the pressure within the confined body and by the absorption of heat therefrom by the pressure reduction in the withdrawn liquid.

36. In the method of claim 35, the improvement wherein a thermo-dynamically generated pressure increase of a predetermined magnitude in the return conduit effects a fluid return flow into and a pressure increase in the storage chamber, effecting thereby a subsequent discharge of fluid into the vapor chamber.

37. A method for reducing the pressure generated in a confined body of volatile fluid when subjected to external heating effects which comprises educting a portion of the fluid from the confined body whenever the pressure of the latter exceeds a predetermined value to thereby decrease the pressure and temperature to which the confined body is subjected, cooling the educted portion of fluid, placing the cooled educted portion in heat exchange relation to the confined body to thereby further reduce the temperature and pressure of the latter, subsequently returning the cooled educted portion to said confined body upon a decrease in the pressure of the latter.

38. A method for reducing the pressure generated in a confined body of volatile fluid when subjected to external heating effects which comprises educting a portion of the fluid from the confined body whenever the pressure of the latter exceeds a predetermined value to thereby decrease the pressure and temperature to which the confined body is subjected, cooling the confined body to further reduce the pressure thereof, subsequently returning the educted portion to said confined body upon a decrease in the pressure of the latter.

39. An apparatus for storing volatile liquids under pressure and reducing the pressures thermo-dynamically generated therein from external heat sources, comprising vapor and storage compartments each sealed against the atmosphere, a conduit having a non-return valve for discharging volatile liquid from the storage compartment to the vapor compartment whenever the pressure of volatile liquid confined in the storage compartment exceeds a predetermined value, means for cooling the volatile liquid confined in the storage chamber to reduce its pressure, a return conduit having a non-return valve for returning the fluid from the vapor compartment to the storage compartment when the pressure in the latter decreases below a predetermined value.

References Cited in the file of this patent

UNITED STATES PATENTS

| Number | Name | Date |
|---|---|---|
| 1,371,427 | Kerr | Mar. 15, 1921 |
| 1,905,971 | Davisson et al. | Apr. 25, 1933 |
| 2,059,942 | Gibson | Nov. 3, 1936 |
| 2,278,192 | Cantacuzene | Mar. 31, 1942 |
| 2,344,765 | Dana et al. | Mar. 21, 1944 |
| 2,408,505 | Brandon et al. | Oct. 1, 1946 |

FOREIGN PATENTS

| Number | Country | Date |
|---|---|---|
| 8,661 | Australia | of 1932 |
| 16,619 | Australia | of 1934 |